(12) United States Patent
Jin et al.

(10) Patent No.: US 11,646,670 B2
(45) Date of Patent: May 9, 2023

(54) POWER CONVERSION MODULE

(71) Applicant: Delta Electronics, Inc., Taoyuan (TW)

(72) Inventors: Da Jin, Taoyuan (TW); Yahong Xiong, Taoyuan (TW); Junguo Cui, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/566,191

(22) Filed: Dec. 30, 2021

(65) Prior Publication Data

US 2022/0255456 A1  Aug. 11, 2022

(30) Foreign Application Priority Data

Feb. 5, 2021  (CN) .......................... 202110163185.8

(51) Int. Cl.
*H02M 3/335*  (2006.01)
*H02M 1/00*  (2006.01)
*H02M 3/00*  (2006.01)

(52) U.S. Cl.
CPC ...... *H02M 3/33592* (2013.01); *H02M 1/0064* (2021.05); *H02M 3/01* (2021.05)

(58) Field of Classification Search
CPC ... H02M 3/33592; H02M 3/01; H02M 1/0064
See application file for complete search history.

(56) References Cited

U.S. PATENT DOCUMENTS 6,392,902 B1 * 5/2002 Jang .................. H02M 3/33573
363/56.02

FOREIGN PATENT DOCUMENTS

CN  100416994 C  9/2008
CN  109245547 B  11/2019

* cited by examiner

*Primary Examiner* — Jue Zhang
(74) *Attorney, Agent, or Firm* — Kirton McConkie; Evan R. Witt

(57) ABSTRACT

A power conversion module includes an input port, an output port, a full-bridge switching circuit, a magnetic device, an energy storage capacitor set and a rectifier circuit. The magnetic device includes a first coupled winding pair and a second coupled winding pair. The first coupled winding pair includes a first winding and a second winding, which are coupled to each other. The second coupled winding pair includes a third winding and a fourth winding, which are coupled to each other. The first winding and the third winding are connected between a first bridge arm and a second bridge arm of the full-bridge switching circuit. The energy storage capacitor set is electrically connected with the input port, and electrically connected with the first winding and the third winding. The rectifier circuit is electrically connected with the second winding, the fourth winding and the output port.

23 Claims, 21 Drawing Sheets

POWER CONVERSION MODULE

CROSS-REFERENCE TO RELATED APPLICATION

This application claims priority to China Patent Application No. 202110163185.8, filed on Feb. 5, 2021, the entire contents of which are incorporated herein by reference for all purposes.

FIELD OF THE INVENTION

The present disclosure relates to a power electronic device, and more particularly to a power conversion module.

BACKGROUND OF THE INVENTION

With the advancement of Internet, cloud computing technologies, electric vehicle technologies, industrial automation technologies and associated technologies, the demands for electric power gradually increase. In other words, the demands for power sources are also increase. Consequently, the power conversion device has to be developed toward high power density and high efficiency. In order to meet the power requirements of high efficiency and high power density, the current industry practice is to increase the bus voltage in the power conversion device from 12V to 48V. Consequently, the current loss on the bus and the cost of the bus are reduced. However, a power conversion module needs to be added to the power conversion device to convert the 48V input voltage into 12V output voltage, which is provided for other loads.

In case that the input voltage is in the range between 36V and 75V (i.e., the rated voltage is 48V) and the output voltage is 12V or 5V, the conventional power conversion module usually uses a half-bridge circuit architecture. That is, the power conversion module includes a half-bridge switching circuit, a transformer and a synchronous rectifier circuit. The half-bridge switching circuit includes a bridge arm that includes an upper switch and a lower switch. The synchronous rectifier circuit includes two synchronous rectifying elements.

In the power conversion module of the conventional half-bridge circuit architecture, the on/off states of the upper switch and the lower switch are complementary to each other. Moreover, in order to avoid the arm-shot problem, the maximum duty cycle of the main switch (e.g., the upper switch) needs to be smaller than 0.5. Consequently, the range of the voltage gain change is narrow, the ratio of the primary side turn number to the secondary side turn number in the transformer is low, the effective primary side current is high, the stress of the synchronous rectifying element in the secondary side is high, and the conversion efficiency is low.

Therefore, there is a need of providing an improved power conversion module in order to overcome the drawbacks of the conventional technologies.

SUMMARY OF THE INVENTION

The present disclosure provides a power conversion module in order to overcome the drawbacks of the conventional technologies. The drawbacks of the conventional technologies include that the range of the voltage gain change is narrow, the ratio of the primary side turn number to the secondary side turn number in the transformer is low, the effective primary side current is high, the stress of the synchronous rectifying element in the secondary side is high, and the conversion efficiency is low.

In accordance with an aspect of present disclosure, a power conversion module is provided. The power conversion module includes an input port, an output port, a full-bridge switching circuit, a magnetic device, an energy storage capacitor set and a rectifier circuit. The input port includes an input positive terminal and an input negative terminal. The output port includes an output positive terminal and an output negative terminal. The full-bridge switching circuit includes a first power switch, a second power switch, a third power switch and a fourth power switch. A first terminal of the first power switch is electrically connected with the input positive terminal. A first terminal of the second power switch and a second terminal of the first power switch are electrically connected with a first midpoint. A second terminal of the second power switch is electrically connected with the input negative terminal. A first terminal of the third power switch is electrically connected with the input positive terminal. A first terminal of the fourth power switch and a second terminal of the third power switch are electrically connected with a second midpoint. A second terminal of the fourth power switch is electrically connected with the input negative terminal. The magnetic device includes a first coupled winding pair and a second coupled winding pair. The first coupled winding pair includes a first winding and a second winding. The second coupled winding pair includes a third winding and a fourth winding. The first winding and the second winding are coupled to each other. The third winding and the fourth winding are coupled to each other. The first winding and the third winding are connected between the first midpoint and the second midpoint. The energy storage capacitor set is electrically connected with the input port and electrically connected with the first winding and the third winding. The rectifier circuit is electrically connected with the second winding, the fourth winding and the output port. The rectifier circuit includes an output capacitor set, a first rectifying element and a second rectifying element. The output capacitor set is electrically connected between the output positive terminal and the output negative terminal. A ratio of an average voltage of the output capacitor set to an average voltage of the energy storage capacitor set is a fixed value. A first current loop is defined by the first rectifying element, the second winding and the output capacitor set collaboratively. A second current loop is defined by the second rectifying element, the fourth winding and the output capacitor set collaboratively.

The above contents of the present disclosure will become more readily apparent to those ordinarily skilled in the art after reviewing the following detailed description and accompanying drawings, in which:

DETAILED DESCRIPTION OF THE EMBODIMENTS

The present disclosure will now be described more specifically with reference to the following embodiments. It is to be noted that the following descriptions of embodiments of this invention are presented herein for purpose of illustration and description only. It is not intended to be exhaustive or to be limited to the precise form disclosed.

Figure 1A:
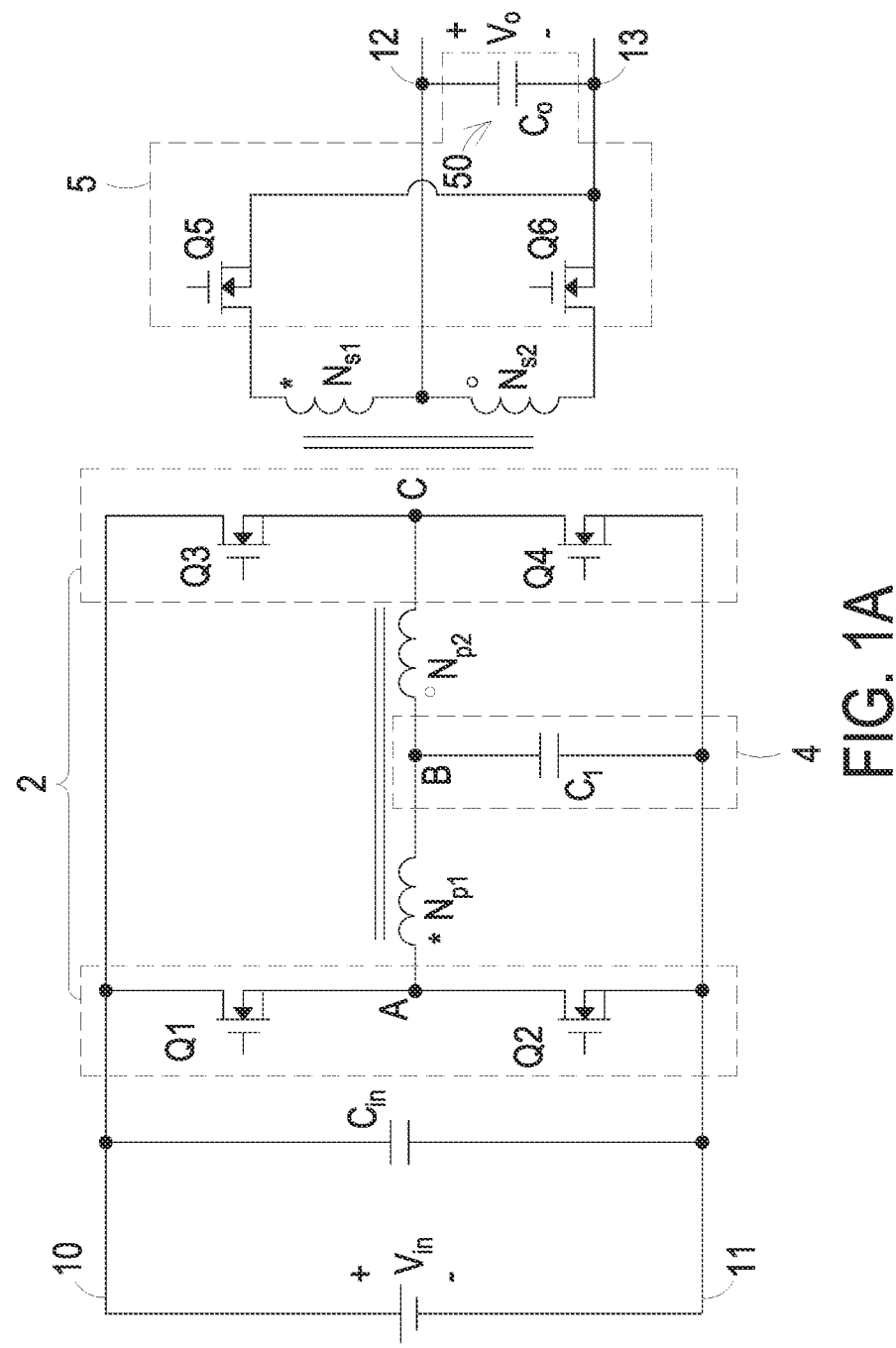
FIG. 1A is a schematic circuit diagram illustrating a power conversion module according to a first embodiment of the present disclosure.
Figure 1B:
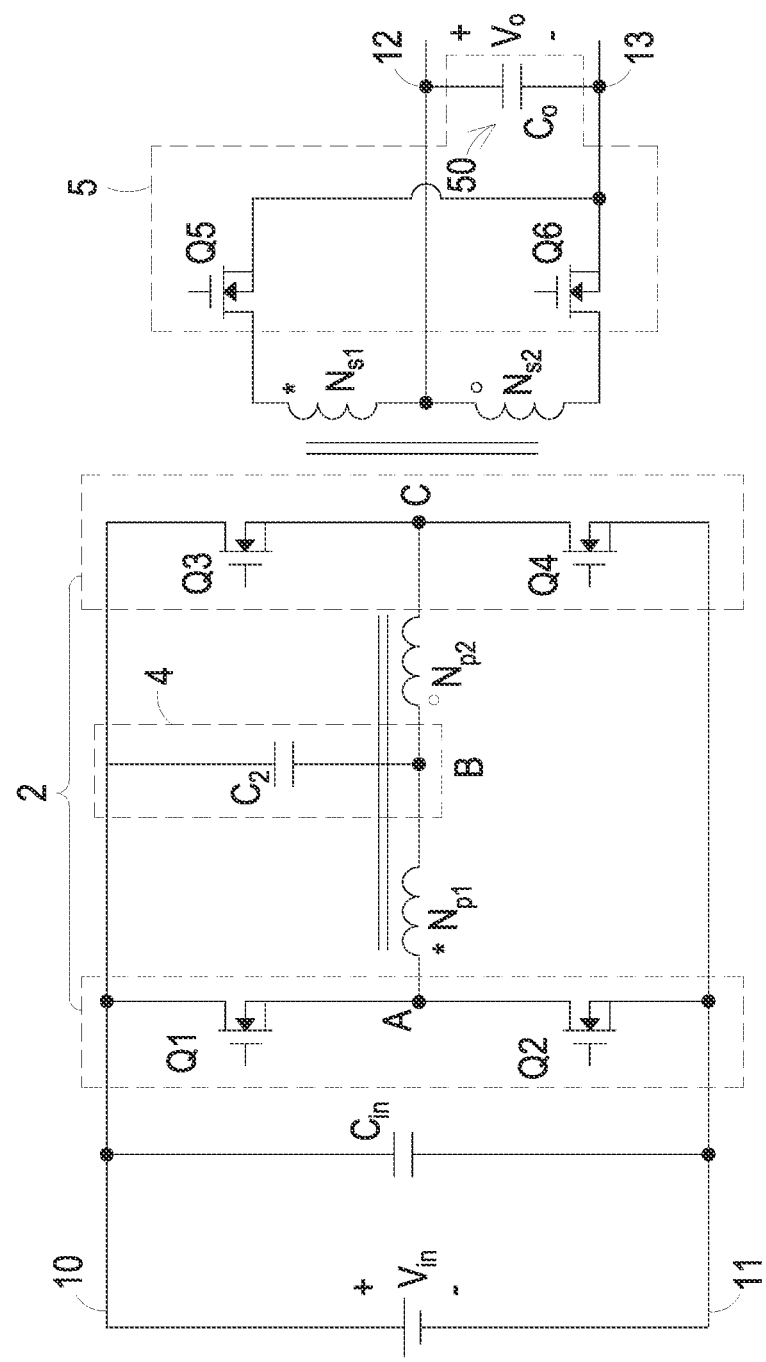
FIG. 1B is a schematic circuit diagram illustrating a power conversion module according to a second embodiment of the present disclosure.
Figure 1C:
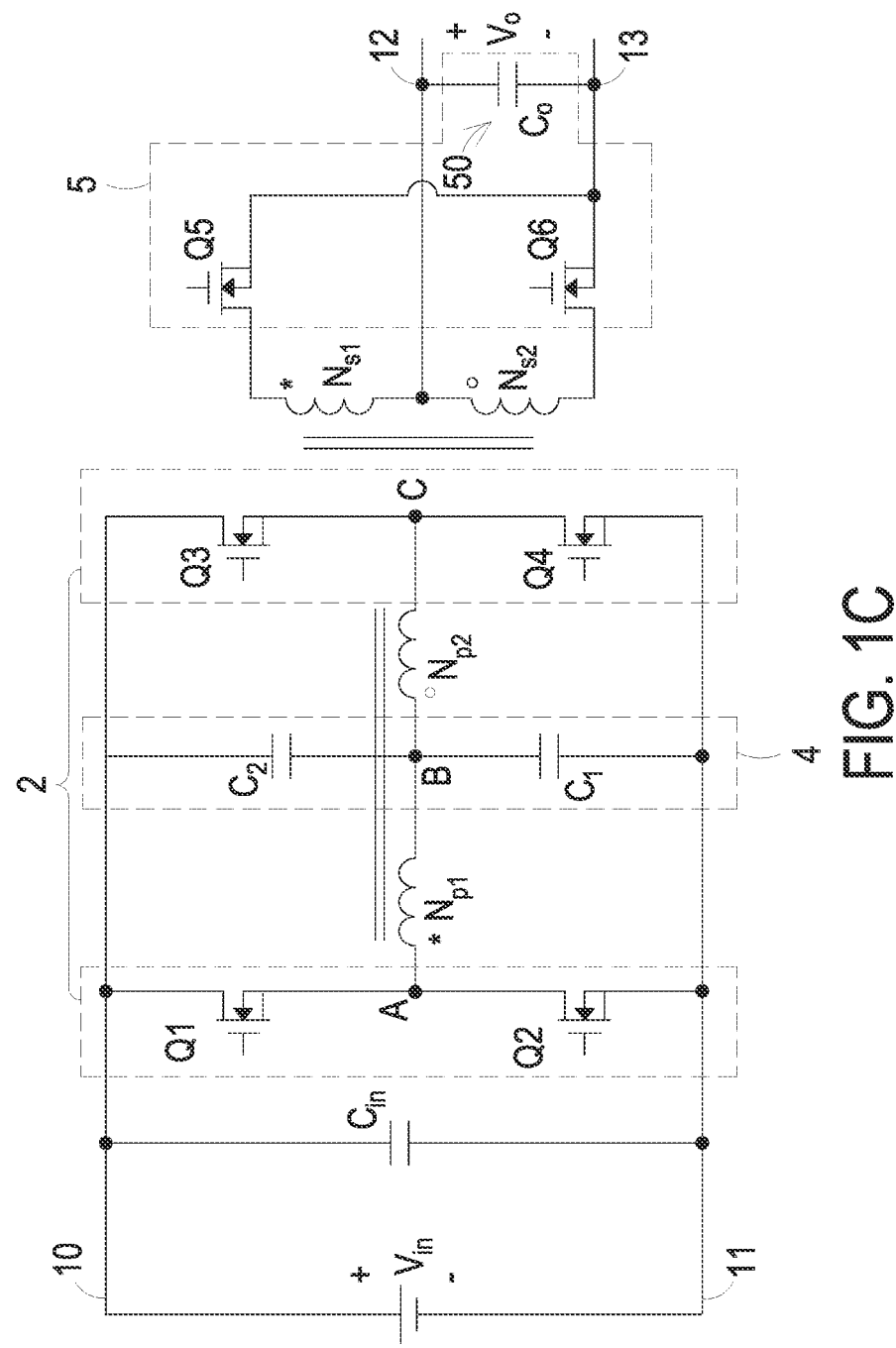
FIG. 1C is a schematic circuit diagram illustrating a power conversion module according to a third embodiment of the present disclosure.
Figure 2:
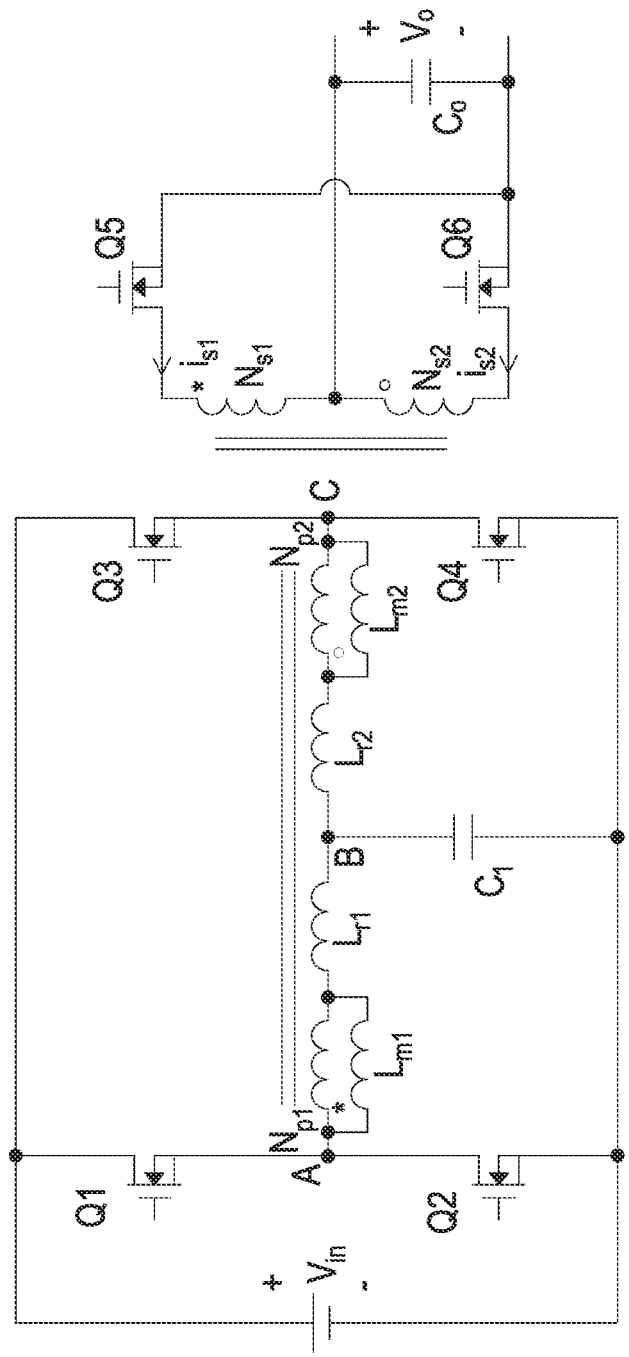
FIG. 2 is an equivalent circuit diagram of the power conversion module as shown in FIG. 1A.
Figure 3A:
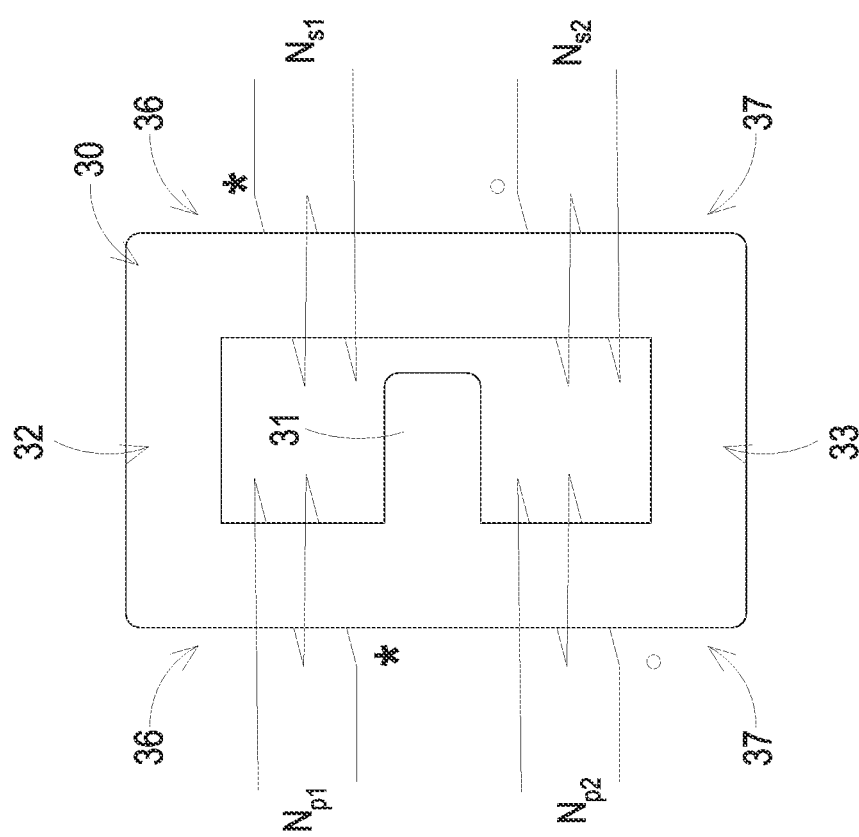
FIG. 3A schematically illustrates an exemplary magnetic device of the power conversion module as shown in FIG. 1A.
Figure 3B:
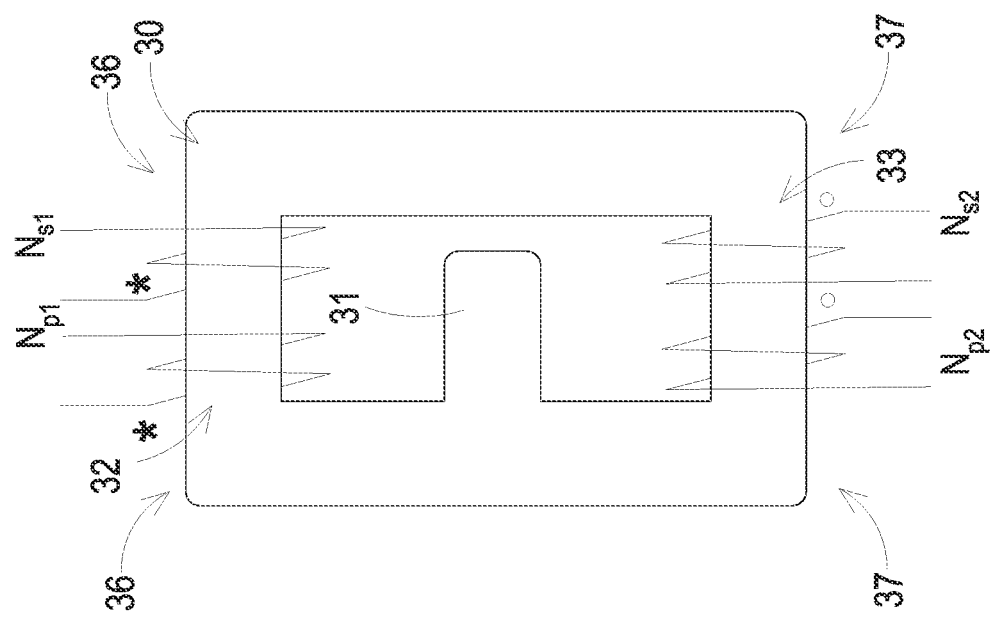
FIG. 3B schematically illustrates another exemplary magnetic device of the power conversion module as shown in FIG. 1A.

FIG. 1A is a schematic circuit diagram illustrating a power conversion module according to a first embodiment of the present disclosure. FIG. 1B is a schematic circuit diagram illustrating a power conversion module according to a second embodiment of the present disclosure. FIG. 1C is a schematic circuit diagram illustrating a power conversion module according to a third embodiment of the present disclosure. FIG. 2 is an equivalent circuit diagram of the power conversion module as shown in FIG. 1A. FIG. 3A schematically illustrates an exemplary magnetic device of the power conversion module as shown in FIG. 1A. FIG. 3B schematically illustrates another exemplary magnetic device of the power conversion module as shown in FIG. 1A. FIGS. 4A, 4B, 4C and 4D schematically illustrate associated components of the power conversion module of FIG. 1A and operated in four different working states. FIG. 5A is a schematic timing waveform diagram illustrating associated voltage signals of the power conversion module as shown in FIG. 1A. FIG. 5B is a schematic timing waveform diagram illustrating associated current signals of the power conversion module as shown in FIG. 1A.

In the embodiment, the power conversion module 1, 1a, 1b, 1c includes an input port, an output port, a full-bridge switching circuit 2, a magnetic device, an energy storage capacitor set 4 and a rectifier circuit 5.

The input port is used to receive an input voltage $V_{in}$. The input port includes an input positive terminal 10 and an input negative terminal 11. The output port is used to provide an output voltage $V_o$. The output port includes an output positive terminal 12 and an output negative terminal 13. For example, the rated value of the input voltage $V_{in}$ is 48V, and the rated value of the output voltage $V_o$ is 12V.

The full-bridge switching circuit 2 includes a first power switch Q1, a second power switch Q2, a third power switch Q3 and a fourth power switch Q4. The first terminal of the first power switch Q1 is electrically connected with the input positive terminal 10. The first terminal of the second power switch Q2 and the second terminal of the first power switch Q1 are connected with a first midpoint A. The second terminal of the second power switch Q2 is electrically connected with the input negative terminal 11. The first power switch Q1 and the second power switch Q2 are collaboratively formed as a first bridge arm of the full-bridge switching circuit 2. The first terminal of the third power switch Q3 is electrically connected with the input positive terminal 10. The first terminal of the fourth power switch Q4 and the second terminal of the third power switch Q3 are electrically connected with a second midpoint C. The second terminal of the fourth power switch Q4 is electrically connected with the input negative terminal 11. The third power switch Q3 and the fourth power switch Q4 are collaboratively formed as a second bridge arm of the full-bridge switching circuit 2.

As shown in FIG. 3A or 3B, the magnetic device 3 includes a magnetic core 30, a first coupled winding pair 36 and a second coupled winding pair 37. Preferably but not exclusively, the magnetic core 30 is shared by the first coupled winding pair 36 and the second coupled winding pair 37 according to a magnetic integration technology. The first coupled winding pair 36 includes a first winding $N_{p1}$ and a second winding $N_{s1}$, which are coupled to each other. The second coupled winding pair 37 includes a third winding $N_{p2}$ and a fourth winding $N_{s2}$, which are coupled to each other. The first winding $N_{p1}$ and the third winding $N_{p2}$ are electrically coupled with each other. The second winding $N_{s1}$ and the fourth winding $N_{s2}$ are electrically coupled with each other. The first terminal of the first winding $N_{p1}$ is electrically connected with the first midpoint A. The second terminal of the first winding $N_{p1}$ and the first terminal of the third winding $N_{p2}$ are electrically connected with a node B. The second terminal of the third winding $N_{p2}$ is electrically connected with the second midpoint C. In other words, the first winding $N_{p1}$ and the third winding $N_{p2}$ are connected in serial between the first midpoint A and the second midpoint C. The second terminal of the second winding $N_{s1}$ is electrically connected with the first terminal of the fourth winding $N_{s2}$. Consequently, the second winding $N_{s1}$ and the fourth winding $N_{s2}$ are collaboratively formed as a center-tap structure.

The energy storage capacitor set 4 is electrically connected with the input port. For example, the energy storage capacitor set 4 is electrically connected with one of the input positive terminal 10 and the input negative terminal 11 or electrically connected with both of the input positive terminal 10 and the input negative terminal 11. Moreover, the energy storage capacitor set 4 includes a single energy storage capacitor or a plurality of energy storage capacitors in serial connection or parallel connection.

In the embodiment of FIG. 1A, the energy storage capacitor set 4 is electrically connected with the input negative terminal 11. Moreover, the energy storage capacitor set 4 is electrically connected with the first winding $N_{p1}$ and the third winding $N_{p2}$. The energy storage capacitor set 4 includes a single energy storage capacitor $C_1$. The first terminal of the energy storage capacitor $C_1$ is electrically connected with the input negative terminal 11. The second terminal of the energy storage capacitor $C_1$ is electrically connected between the first winding $N_{p1}$ and the third winding $N_{p2}$. In other words, the second terminal of the energy storage capacitor $C_1$ is electrically connected with the node B.

It is noted that the constituents of the energy storage capacitor set or the connecting relationship of the energy storage capacitor set may be varied. FIG. 1B is a schematic circuit diagram illustrating a power conversion module according to a second embodiment of the present disclosure. FIG. 1C is a schematic circuit diagram illustrating a power conversion module according to a third embodiment of the present disclosure. In comparison with the power conversion module of FIG. 1A, the constituents of the energy storage capacitor sets or the connecting relationships of the energy storage capacitor sets in the power conversion module of FIGS. 1B and 1C are distinguished. The other components of the three embodiments are similar, and not redundantly described herein.

In the embodiment of FIG. 1B, the energy storage capacitor set 4 is electrically connected with the input positive terminal 10. The energy storage capacitor set 4 includes a single energy storage capacitor $C_2$. The first terminal of the energy storage capacitor $C_2$ is electrically connected with the input positive terminal 10 of the input port. The second terminal of the energy storage capacitor $C_2$ is electrically connected between the first winding $N_{p1}$ and the third winding $N_{p2}$. In other words, the second terminal of the energy storage capacitor $C_2$ is electrically connected with the node B.

In the embodiment of FIG. 1C, the energy storage capacitor set 4 is electrically connected with the input positive terminal 10 and the input negative terminal 11. The energy storage capacitor set 4 includes an energy storage capacitor $C_1$ and an energy storage capacitor $C_2$. The first terminal of the energy storage capacitor $C_1$ is electrically connected with the input negative terminal 11 of the input port. The second terminal of the energy storage capacitor $C_1$ is electrically connected between the first winding $Np_1$ and the third winding $N_{p2}$. In other words, the second terminal of the energy storage capacitor $C_1$ is electrically connected with the node B. The first terminal of the energy storage capacitor $C_2$ is electrically connected with the input positive terminal 10 of the input port. The second terminal of the energy storage capacitor $C_2$ is electrically connected between the first winding $N_{p1}$ and the third winding $N_{p2}$. In other words, the second terminal of the energy storage capacitor $C_2$ is electrically connected with the node B. It is noted that any of the capacitors mentioned in the following content can be similar to the aforementioned energy storage capacitor $C_1$ and may include a single energy storage capacitor or a plurality of energy storage capacitors in serial connection or parallel connection.

The rectifier circuit 5 is electrically connected with the second winding $N_{s1}$, the fourth winding $N_{s2}$ and the output port. The rectifier circuit 5 includes an output capacitor set 50, a first rectifying element Q5 and a second rectifying element Q6. In addition, the rectifier circuit 5, the second winding $N_{s1}$ and the fourth winding $N_{s2}$ are collaboratively formed as a full-wave rectifier circuitry structure. In an embodiment, the first rectifying element Q5 and the second rectifying element Q6 are power switches. A first current loop is defined by the first rectifying element Q5, the second winding $N_{s1}$ and at least a part of the output capacitor set 50 collaboratively. A second current loop is defined by the second rectifying element Q6, the fourth winding $N_{s2}$ and at least a part of the output capacitor set 50 collaboratively. The output capacitor set 50 is electrically connected with the output positive terminal 12 and the output negative terminal 13. The output capacitor set 50 includes at least one output capacitor $C_o$. The first terminal of the first rectifying element Q5 is electrically connected with the first terminal of the second winding $N_{s1}$. The second terminal of the first rectifying element Q5 is electrically connected with the second terminal of the output capacitor $C_o$ and the output negative terminal 13. The first terminal of the output capacitor $C_o$ is electrically connected with the second terminal of the second winding $N_{s1}$ and the first terminal of the fourth winding $N_{s2}$. Consequently, the first current loop is defined by the first rectifying element Q5, the second winding $N_{s1}$ and the output capacitor $C_o$ collaboratively. The first terminal of the second rectifying element Q6 is electrically connected with the second terminal of the fourth winding $N_{s2}$. The second terminal of the second rectifying element Q6 is electrically connected with the second terminal of the output capacitor $C_o$ and the output negative terminal 13. Consequently, the second current loop is defined by the second rectifying element Q6, the fourth winding $N_{s2}$ and the output capacitor $C_o$ collaboratively. In case that the first rectifying element Q5 and the second rectifying element Q6 are power switches, the first rectifying element Q5 and the second rectifying element Q6 can be controlled in a synchronous rectification manner. It is noted that the examples of the first rectifying element Q5 and the second rectifying element Q6 are not restricted. For example, in another embodiment, the first rectifying element Q5 and the second rectifying element Q6 are diodes.

In some embodiments, the power conversion module 1 further includes an input capacitor $C_{in}$. The input capacitor $C_{in}$ is electrically connected between the input positive terminal 10 and the input negative terminal 11.

As mentioned above, the power conversion module of the present disclosure includes the full-bridge switching circuit 2, the first coupled winding pair 36, the second coupled winding pair 37 and the energy storage capacitor set 4. The energy storage capacitor set 4 is electrically connected with the node B and the input negative terminal 11. Due to this circuitry design, the maximum duty cycle of the power conversion module can be previously determined. For example, by adjusting the turn ratio between the first winding $N_{p1}$ and the second winding $N_{s1}$ or the turn ratio between the third winding $N_{p2}$ and the fourth winding $N_{s2}$, the maximum duty cycle of the power conversion module can be previously determined. For example, the duty cycle can be expanded to the value greater than 0.5 or even close to 1. Consequently, the power conversion module has many benefits. For example, the voltage gain variation range of the power conversion module is broadened. Moreover, the turn ratio between the first winding $N_{p1}$ and the second winding $N_{s1}$ or the turn ratio between the third winding $N_{p2}$ and the fourth winding $N_{s2}$ is large. The current effective value of the first winding $N_{p1}$ or the third winding $N_{p2}$ is low. The rectifying elements capable of withstanding lower voltages are suitably used as the first rectifying element Q5 and the second rectifying element Q6. Moreover, the conversion efficiency of the power conversion module is higher.

In the above embodiments, the first terminal of the first winding $N_{p1}$ and the first terminal of the second winding $N_{s1}$ are common-polarity terminals, and the first terminal of the third winding $N_{p2}$ and the first terminal of the fourth winding $N_{s2}$ are the common-polarity terminals. The first winding $N_{p1}$ and the second winding $N_{s1}$ are respectively used as a primary winding and a secondary winding of a first transformer. The third winding $N_{p2}$ and the fourth winding $N_{s2}$ are respectively used as a primary winding and a secondary winding of a second transformer. According to the relationship between the first winding $N_{p1}$ and the second winding $N_{s1}$ or the relationship between the third winding $N_{p2}$ and the fourth winding $N_{s2}$, the power conversion module can be divided into a primary side and a secondary side. For example, the first winding $N_{p1}$ and the third winding $N_{p2}$ are located at the primary side, and the second winding $N_{s1}$ and the fourth winding $N_{s2}$ are located at the secondary side.

As shown in FIGS. 3A and 3B, the magnetic core 30 includes a middle leg 31, a first lateral leg 32 and a second lateral leg 33. The air gap of the middle leg 31 is greater than the air gap of the first lateral leg 32 and the air gap of the second lateral leg 33. The first winding $N_{p1}$ and the second winding $N_{s1}$ are wound on the first lateral leg 32. The third winding $N_{p2}$ and the fourth winding $N_{s2}$ are wound on the second lateral leg 33. As shown in FIG. 3A, the first winding $N_{p1}$ and the second winding $N_{s1}$ are wound on two opposite sides of the first lateral leg 32, and the third winding $N_{p2}$ and the fourth winding $N_{s2}$ are wound on two opposite sides of the second lateral leg 33. As shown in FIG. 3B, the first winding $N_{p1}$ and the second winding $N_{s1}$ are wound on the same side of the first lateral leg 32, and the third winding $N_{p2}$, and the fourth winding $N_{s2}$ are wound on the same side of the second lateral leg 33. Moreover, the winding directions of the second winding $N_{s1}$ and the fourth winding $N_{s2}$ are specially designed. Consequently, the DC magnetic fluxes generated on the first lateral leg 32 and the second lateral leg 33 are superimposed on the middle leg 31, and the AC magnetic fluxes generated on the first lateral leg 32 and the second lateral leg 32 are cancelled out on the middle leg 31.

Preferably, the material of the magnetic core 30 is specially designed. In an embodiment, the material of the middle leg 31 and the material of the other portion of the magnetic core 30 are different. For example, the middle leg 31 is made of iron powder, and the rest of the magnetic core 30 is made of ferrite. Consequently, the core loss of the magnetic core 30 is reduced, and the core loss of the middle leg 31 is not largely increased. In an embodiment, the cross section area of the middle leg 31 and the cross section area of the first lateral leg 32 (or the second lateral leg 32) are equal.

FIG. 2 is an equivalent circuit diagram of the power conversion module as shown in FIG. 1A. The power conversion module 1 includes equivalent magnetized inductors $L_{m1}$, $L_{m2}$ and equivalent leakage inductor $L_{r1}$, $L_{r2}$. The equivalent magnetized inductor $L_{m1}$ is the magnetized inductor of the first coupled winding pair 36. In addition, the equivalent magnetized inductor $L_{m1}$ is connected with the first winding $N_{p1}$ in parallel. The equivalent magnetized inductor $L_{m2}$ is the magnetized inductor of the second coupled winding pair 37. In addition, the equivalent magnetized inductor $L_{m2}$ is connected with the third winding $N_{p2}$ in parallel. The equivalent leakage inductor $L_{r1}$ is the leakage inductor of the first coupled winding pair 36. In addition, the equivalent leakage inductor $L_{r1}$ and the first winding $N_{p1}$ are connected with each other in series between the first midpoint A and the node B. The equivalent leakage inductor $L_{r2}$ is the leakage inductor of the second coupled winding pair 37. In addition, the equivalent leakage inductor $L_{r2}$ and the third winding $N_{p2}$ are connected with each other in series between the node B and the second midpoint C.

In an embodiment, the turn ratio between the first winding $N_{p1}$ and the second winding $N_{s1}$ is N, or the turn ratio between the third winding $N_{p2}$ and the fourth winding $N_{s2}$ is N, wherein N is a positive integer smaller than 100.

The operations of the power conversion module 1, 1a will be illustrated with reference to FIGS. 4A to 4D. In these drawings, the current paths are indicated by solid lines, and the non-current paths are indicated by dashed lines. As mentioned above, the energy storage capacitor set 4 is electrically connected with one of the input positive terminal 10 and the input negative terminal 11, or electrically connected with both of the input positive terminal 10 and the input negative terminal 11. In these embodiments, the operations of the circuitry structures are similar.

In the embodiment of FIG. 1A, the energy storage capacitor set 4 is electrically connected with the input negative terminal 11. In this situation, the first power switch Q1 and the third power switch Q3 are referred as main power switches. In the embodiment of FIG. 1B, the energy storage capacitor set 4 is electrically connected with the input negative terminal 11. In this situation, the second power switch Q2 and the fourth power switch Q4 are referred as main power switches.

Please refer to FIGS. 5A and 5B and also referred to FIG. 1A and FIGS. 4A to 4D. In the power conversion module 1a of FIG. 1A, the on/off states of the first power switch Q1 and the on/off states of the second power switch Q2 are complementary to each other, and the on/off states of the third power switch Q3 and the on/off states of the fourth power switch Q4 are complementary to each other. The phase difference between the driving signals for controlling the first power switch Q1 and the third power switch Q3 is 180 degrees. The phase difference between the driving signals for controlling the second power switch Q2 and the fourth power switch Q4 is 180 degrees. In addition, the on/off states of the first rectifying element Q5 and the second power switch Q2 are identical, and the on/off states of the second rectifying element Q6 and the fourth power switch Q4 are identical.

As shown in FIGS. 5A and 5B, the time interval between the time point T0 and the time point T7 is equal to one switching cycle. In one switching cycle, the power conversion module is operated in four working states of FIGS. 4A-4D sequentially.

Figure 4A:
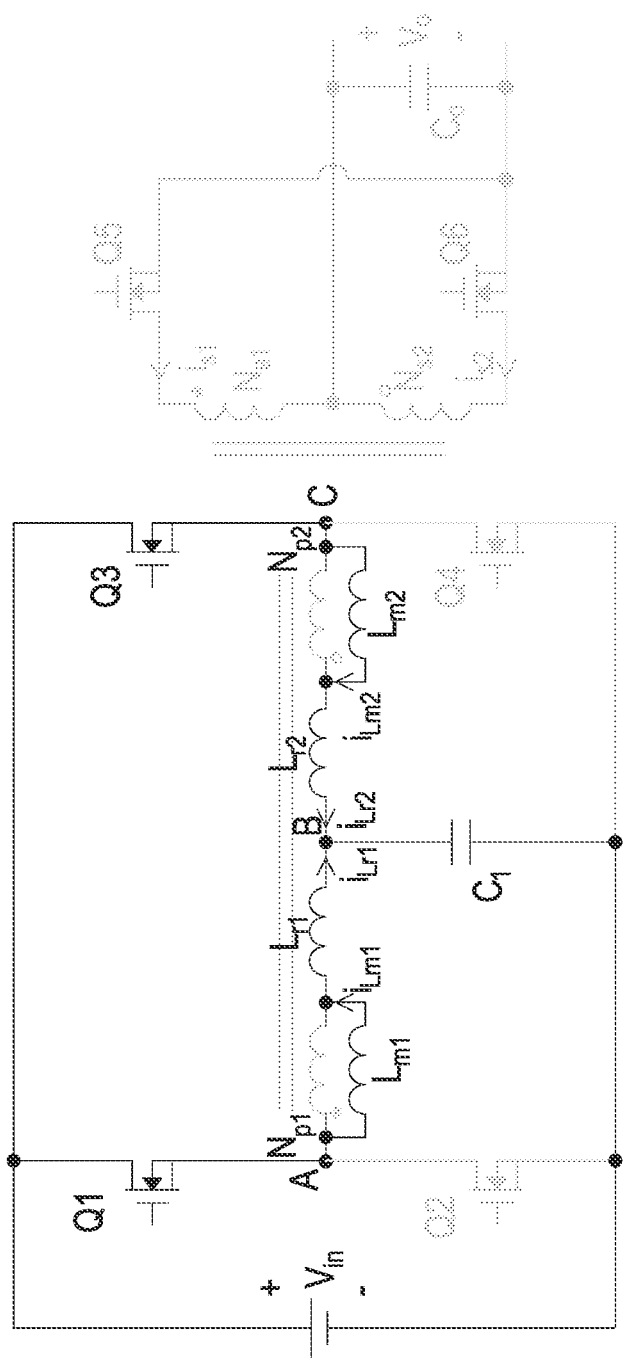
FIGS. 4A, 4B, 4C and 4D schematically illustrate associated components of the power conversion module of FIG. 1A and operated in four different working states.
Figure 5A:
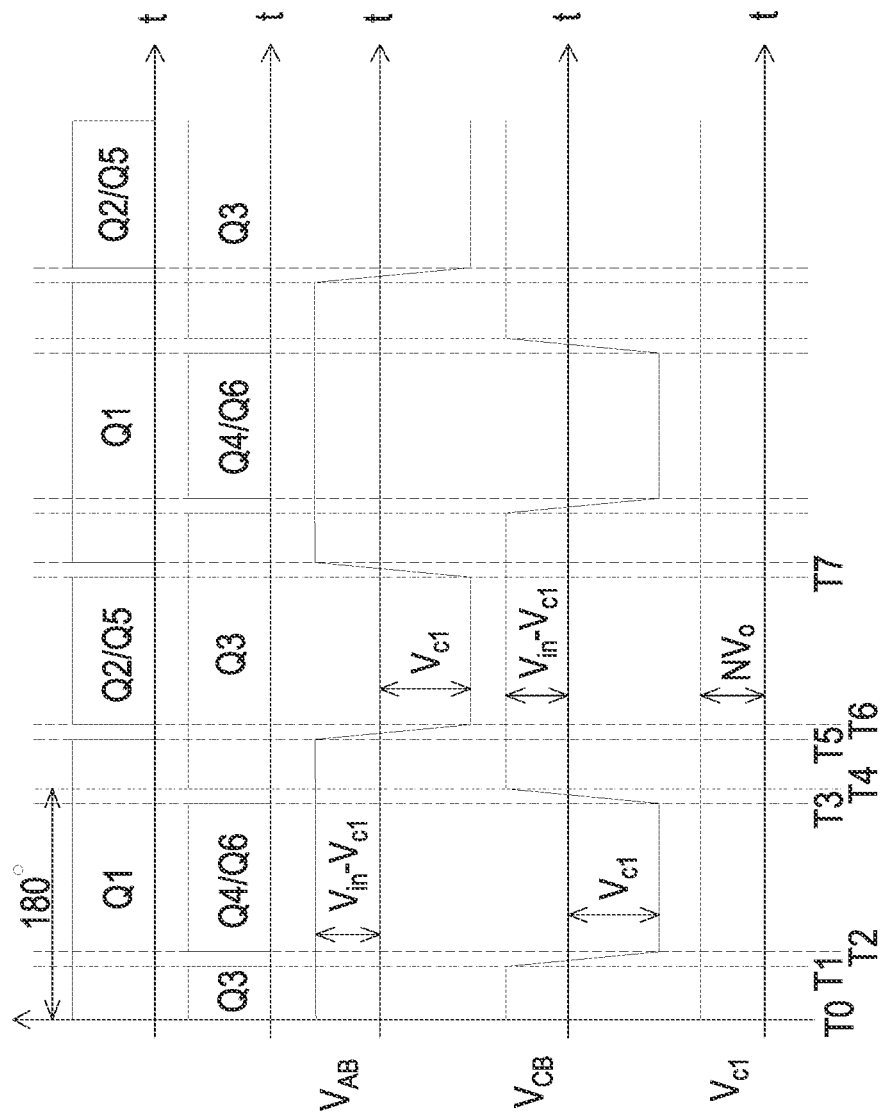
FIG. 5A is a schematic timing waveform diagram illustrating associated voltage signals of the power conversion module as shown in FIG. 1A.
Figure 5B:
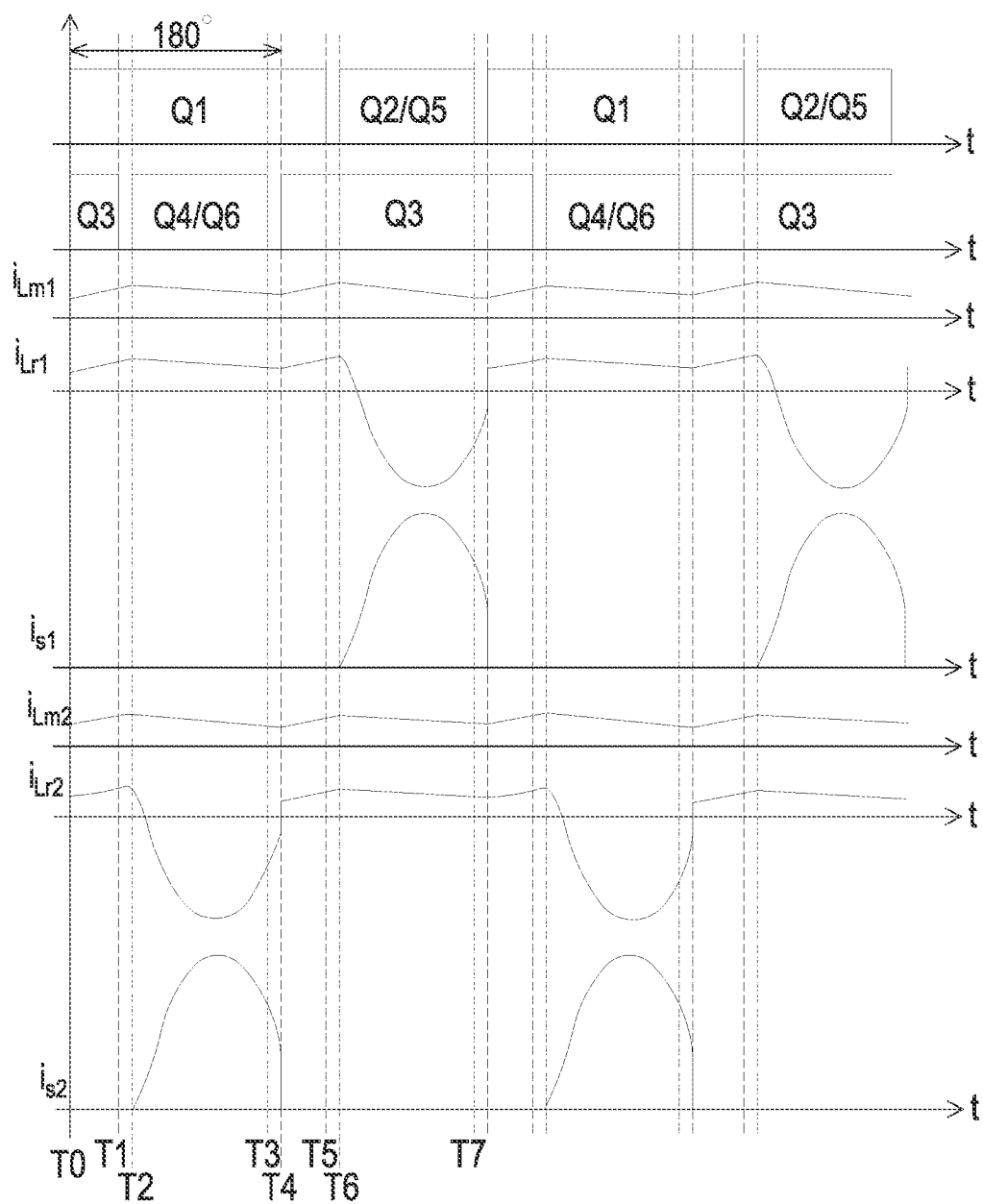
FIG. 5B is a schematic timing waveform diagram illustrating associated current signals of the power conversion module as shown in FIG. 1A.

Please refer to FIGS. 5A and 5B and also referred to FIG. 4A. In the time interval between the time point T0 and the time point T1, the power conversion module 1, 1a is operated in the first working state. In this situation, the first power switch Q1 and the third power switch Q3 are turned on, and the second power switch Q2, the fourth power switch Q4, the first rectifying element Q5 and the second rectifying element Q6 are turned off. If the voltage drop across the equivalent leakage inductor La is ignored, the terminal voltage $V_{AB}$ across the equivalent magnetized inductor $L_{m1}$ is equal to the input voltage $V_{in}$ minus the capacitor voltage $V_{c1}$ of the energy storage capacitor $C_1$, i.e., $V_{AB}=V_{in}-V_{c1}$. In this working state, the equivalent magnetized inductor $L_{m1}$ and the equivalent leakage inductor $L_{r1}$ are connected with each other in series. Consequently, the magnetized current $i_{Lm1}$ and the leakage current $i_{Lr1}$ are equal and gradually rise. Similarly, the equivalent magnetized inductor $L_{m2}$ and the equivalent leakage inductor $L_{r2}$ are connected with each other in series. Consequently, the magnetized current $i_{Lm2}$ and the leakage current $i_{Lr2}$ are equal and gradually rise.

Figure 4B:
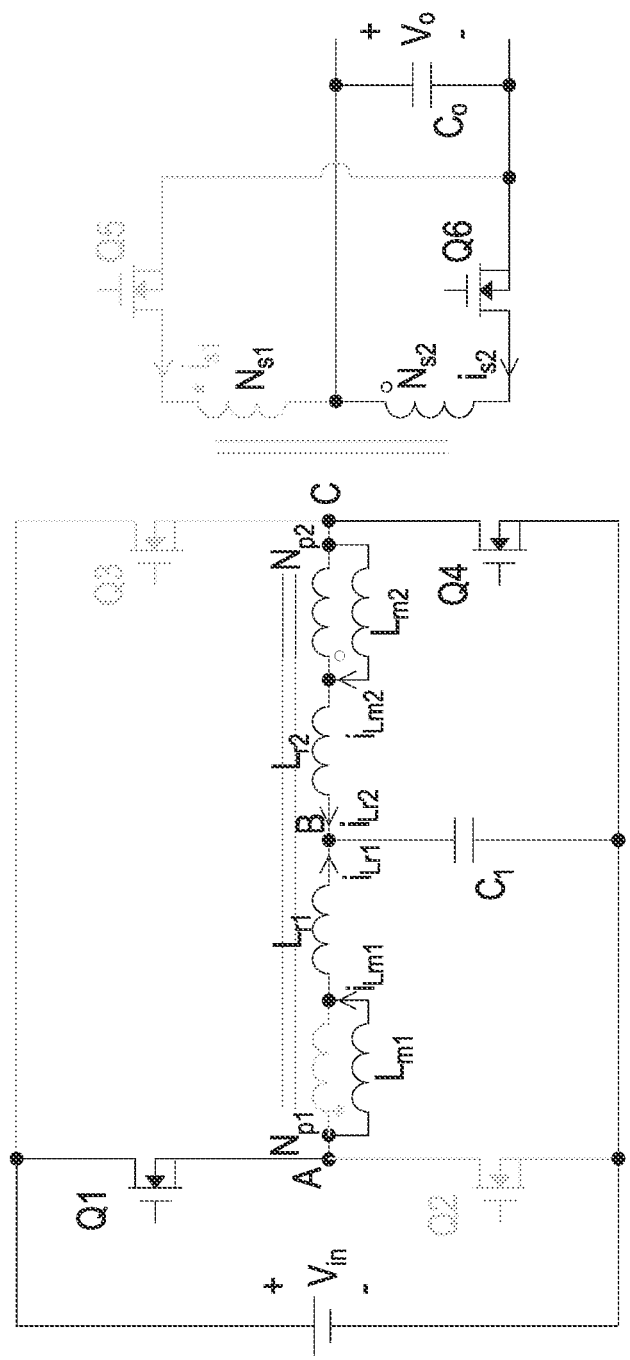

Please refer to FIGS. 5A and 5B and also referred to FIG. 4B. In the time interval between the time point T2 and the time point T3, the power conversion module 1, 1a is operated in the second working state. In this situation, the first power switch Q1, the fourth power switch Q4 and the second rectifying element Q6 are turned on, and the second power switch Q2, the third power switch Q3 and the first rectifying element Q5 are turned off. The equivalent magnetized inductor $L_{m2}$ is clamped by the output voltage $V_o$, and the terminal voltage $V_{CB}$ across the equivalent magnetized inductor $L_{m2}$ is equal to the capacitor voltage $V_{c1}$ of the energy storage capacitor $C_1$. Consequently, the capacitor voltage $V_{c1}$ of the energy storage capacitor $C_1$ is equal to N times the output voltage $V_o$, i.e., $V_{c1}=N\times V_o$. In other words, the ratio between the capacitor voltage $V_{c1}$ of the energy storage capacitor $C_1$ and the average voltage of the output capacitor $C_o$ is a fixed value N. Moreover, the output capacitor $C_o$ is equivalent to the primary side of the power conversion module (i.e., the position of the third winding $N_{p2}$), and the equivalent capacitance is equal to $C_o/N^2$. The serially-connected structure of the output capacitor $C_o$ and the energy storage capacitor $C_1$ and the equivalent leakage inductor $L_{r2}$ result in a resonance effect to generate an oscillation current. Consequently, the electric energy is transmitted to the secondary side of the power conversion module 1, 1a. The resonant frequency fr can be expressed by the following mathematic formula:

$$f_r = 1/2\pi \sqrt{L_{r2}(C_1 C_o/(C_o+C_1 N^2))} \quad (1)$$

In the above mathematic formula (1), Lr2 is the inductance of the equivalent leakage inductor $L_{r2}$, $C_1$ is the capacitance of the energy storage capacitor $C_1$, and $C_o$ is the capacitance of the output capacitor $C_o$. Please refer to waveform diagram of FIG. 5B. In order to avoid the reverse recovery loss caused by the freewheeling of the body diode of the fourth power switch Q4 after it is turned off, the value (1−D)/fsw can be controlled to be smaller than 0.5/fr. Consequently, the power conversion module 1, 1a is operated in the over-resonant mode to ensure that the current is a forward current when the fourth power switch Q4 is turned off (Here, the forward current flows from the Drain to Source of the fourth power switch Q4.), and the body diode of the fourth power switch Q4 is prevented from freewheeling. In the above formula, fsw is a switching frequency of the power switch of the full-bridge switching circuit 2, and D is the duty cycle of the main power switch. That is, in the first embodiment, D is the duty cycle of the first power switch Q1 and the third power switch Q3.

Figure 4C:
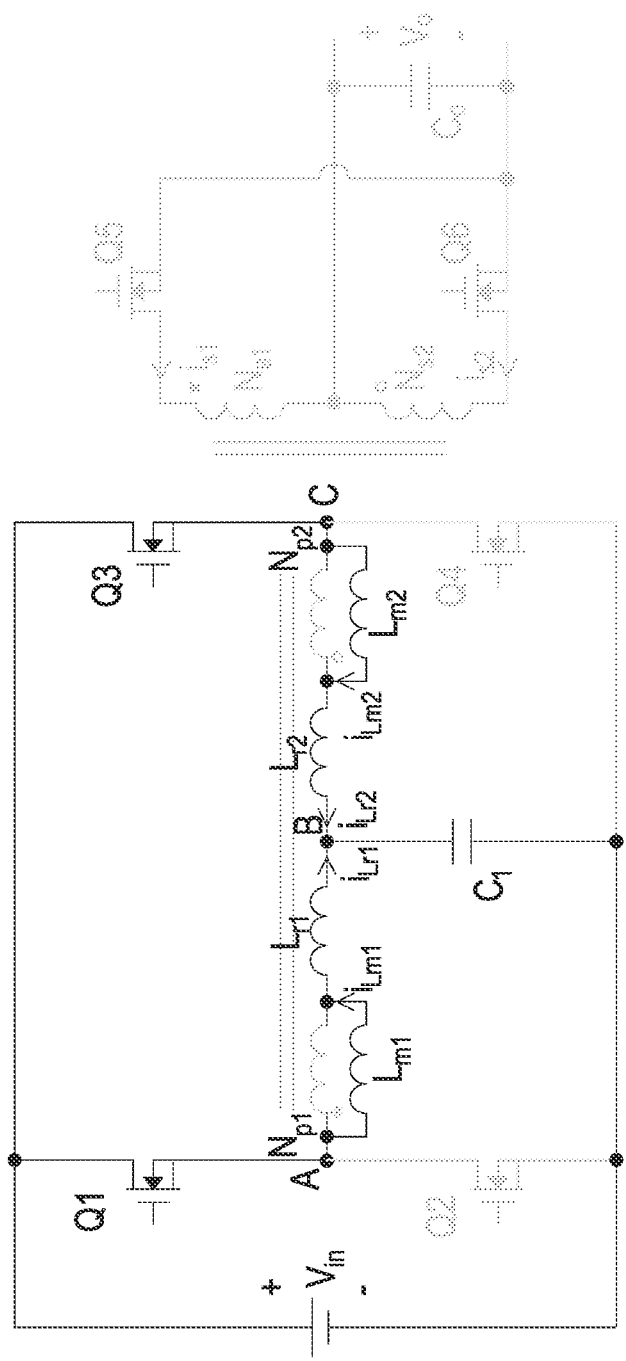

Please refer to FIGS. 5A and 5B and also referred to FIG. 4C. In the time interval between the time point T4 and the time point T5, the power conversion module 1, 1a is operated in the third working state. In this situation, the first power switch Q1 and the third power switch Q3 are turned on, and the second power switch Q2, the fourth power switch Q4, the first rectifying element Q5 and the second rectifying element Q6 are turned off. Meanwhile, the magnetized currents $iL_{m1}$ and $iL_{m2}$ gradually rise.

Figure 4D:
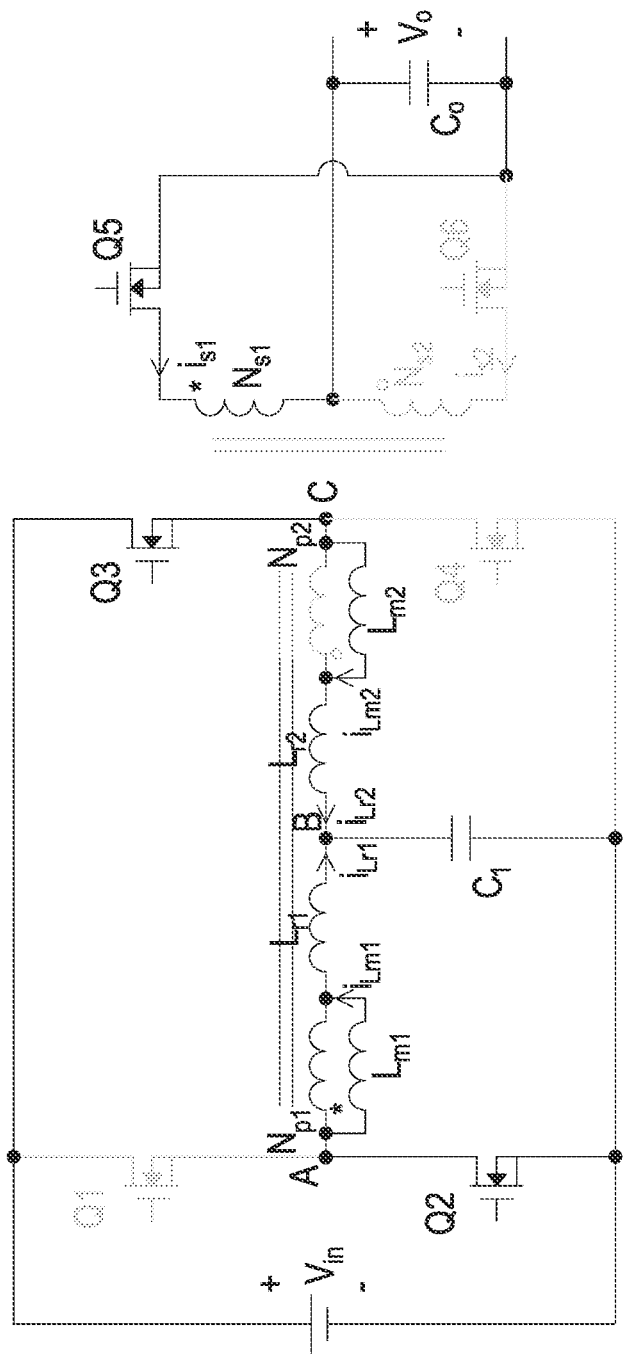

Please refer to FIGS. 5A and 5B and also referred to FIG. 4D. In the time interval between the time point T6 and the time point T7, the power conversion module 1, 1a is operated in the fourth working state. In this situation, the second power switch Q2, the third power switch Q3 and the first rectifying element Q5 are turned on, and the first power switch Q1, the fourth power switch Q4 and the second rectifying element Q6 are turned off. The equivalent magnetized inductor $L_{m1}$ is clamped by the output voltage $V_o$, and the terminal voltage $V_{AB}$ across the equivalent magnetized inductor $L_{m1}$ is equal to the capacitor voltage $V_{c1}$ of the energy storage capacitor $C_1$. That is, the capacitor voltage $V_{c1}$ of the energy storage capacitor $C_1$ is equal to N times the output voltage $V_o$. Moreover, the output capacitor $C_o$ is equivalent to the primary side of the power conversion module 1, 1a (i.e., the position of the third winding $N_{p1}$), and the equivalent capacitance is equal to $C_o/N^2$. The serially-connected structure of the output capacitor $C_o$ and the energy storage capacitor $C_1$ and the equivalent leakage inductor $L_{r1}$ result in a resonance effect to generate an oscillation current. Consequently, the electric energy is transmitted to the secondary side of the power conversion module 1, 1a. Similarly, the power conversion module 1, 1a is operated in the over-resonant mode to ensure that the current is a forward current when the second power switch Q2 is turned off (Here, the forward current flows from the Drain to Source of the second power switch Q2.), and the body diode of the second power switch Q2 is prevented from freewheeling. Consequently, the reverse recovery loss is avoided.

During the switching cycle, the power conversion module 1, 1a is operated in the first working state, the second working state, the third working state and the fourth working state sequentially. According to the volt-second balance of the equivalent magnetized inductor $L_{m1}$, the following mathematic formula can be obtained.

$$(V_{in}-V_{c1})\cdot D = V_{c1}\cdot(1-D) \quad (2)$$

As mentioned above, the capacitor voltage $V_{c1}$ of the energy storage capacitor $C_1$ is equal to N times the output voltage $V_o$. According to the mathematic formula (2), the relationship between the input voltage Vin and the output voltage $V_o$ can be expressed by the following mathematic formula:

$$V_o = \frac{DV_{in}}{N} \quad (3)$$

During the operation of the power conversion module 1, 1a, the duty cycle D is adjusted through a close-loop control mechanism according to the change of the input voltage $V_{in}$. Consequently, the stabilization of the output voltage $V_o$ can be achieved. In an embodiment, the switching frequency fsw is changed with the duty cycle D. Consequently, the value (1−D)/fsw can be controlled to be smaller than 0.5/fr. Similarly, the power conversion module 1, 1a is operated in the over-resonant mode to ensure that the current is a forward current when the second power switch Q2 or the fourth power switch Q4 is turned off, and the body diode of the second power switch Q2 or the fourth power switch Q4 is prevented from freewheeling. Consequently, the reverse recovery loss is avoided.

In the embodiment of FIG. 1A, the first terminal of the energy storage capacitor $C_1$ is electrically connected with the input negative terminal 11, and the second terminal of the energy storage capacitor $C_1$ is electrically connected with the node B between the first winding $N_{p1}$ and the third winding $N_{p2}$. Moreover, the capacitor voltage $V_{c1}$ of the energy storage capacitor $C_1$ is equal to N times the output voltage $V_o$, i.e., $V_{c1}=N\times V_o$. In other words, the ratio between the capacitor voltage $V_{c1}$ of the energy storage capacitor $C_1$ and the average voltage of the output capacitor $C_o$ is a fixed value N. In the embodiment of FIG. 1B, the first terminal of the energy storage capacitor $C_2$ is electrically connected with the input positive terminal 10, and the second terminal of the energy storage capacitor $C_2$ is electrically connected with the node B between the first winding $N_{p1}$ and the third winding $N_{p2}$. The capacitor voltage $V_{c2}$ of the energy storage capacitor $C_2$ can be expressed as: $V_{c2}=V_{in}-N\times V_o$. In other words, the ratio between the capacitor voltage $V_{c2}$ of the energy storage capacitor $C_2$ and the average voltage of the output capacitor $C_o$ is a fixed value, (N/D−N). In the embodiment of FIG. 1C, the energy storage capacitor set 4 includes the energy storage capacitor $C_1$ and the energy storage capacitor $C_2$. Similarly, the ratio between the capacitor voltage $V_{c1}$ of the energy storage capacitor $C_1$ and the average voltage of the output capacitor $C_o$ and the ratio between the capacitor voltage $V_{c2}$ of the energy storage capacitor $C_2$ and the average voltage of the output capacitor $C_o$ are fixed values.

Moreover, as shown in FIG. 5B, the current $i_{s1}$ flowing through the first rectifying element Q5 and the current $i_{s2}$ flowing through the second rectifying element Q6 are sine wave currents or partial sine wave currents. It is noted that the waveforms of the current $i_{s1}$ and the current $i_{s2}$ are not restricted.

As previously described, in the power conversion module of the conventional half-bridge circuit architecture, the on/off states of the upper switch and the lower switch of the half-bridge switching circuit are complementary to each other. In contrast, the power conversion module of the present disclosure includes the full-bridge switching circuit 2. In the full-bridge switching circuit 2, the on/off states of the first power switch Q1 and the on/off states of the second power switch Q2 are complementary to each other, and the on/off states of the third power switch Q3 and the on/off states of the fourth power switch Q4 are complementary to each other. Moreover, in this embodiment, the energy storage capacitor set 4 is electrically connected the input negative terminal 11 and the node B between the first winding $N_{p1}$ and the third winding $N_{p2}$. Due to this circuitry design, the maximum duty cycle of the primary switch of the power conversion module can be close to 1. Consequently, the voltage gain variation range of the power conversion module is broadened. In case that the turn ratio between the first winding $N_{p1}$ and the second winding $N_{s1}$ or the turn ratio between the third winding $N_{p2}$ and the fourth winding $N_{s2}$ is larger, the primary current effective value of the first winding $N_{p1}$ and the third winding $N_{p2}$ is reduced, and the primary switching loss and the winding loss are reduced. Moreover, since the voltage stress of the first rectifying element Q5 and the second rectifying element Q6 in the rectifier circuit 5 is reduced, and the secondary side loss is also reduced. Consequently, the conversion efficiency of the power conversion module is enhanced.

In some embodiments, the resonant parameters are specially designed. Consequently, when the first rectifying element Q5 or the second rectifying element Q6 is turned off, the current flowing through the first rectifying element Q5 or the second rectifying element Q6 is greater than zero.

Figure 6:
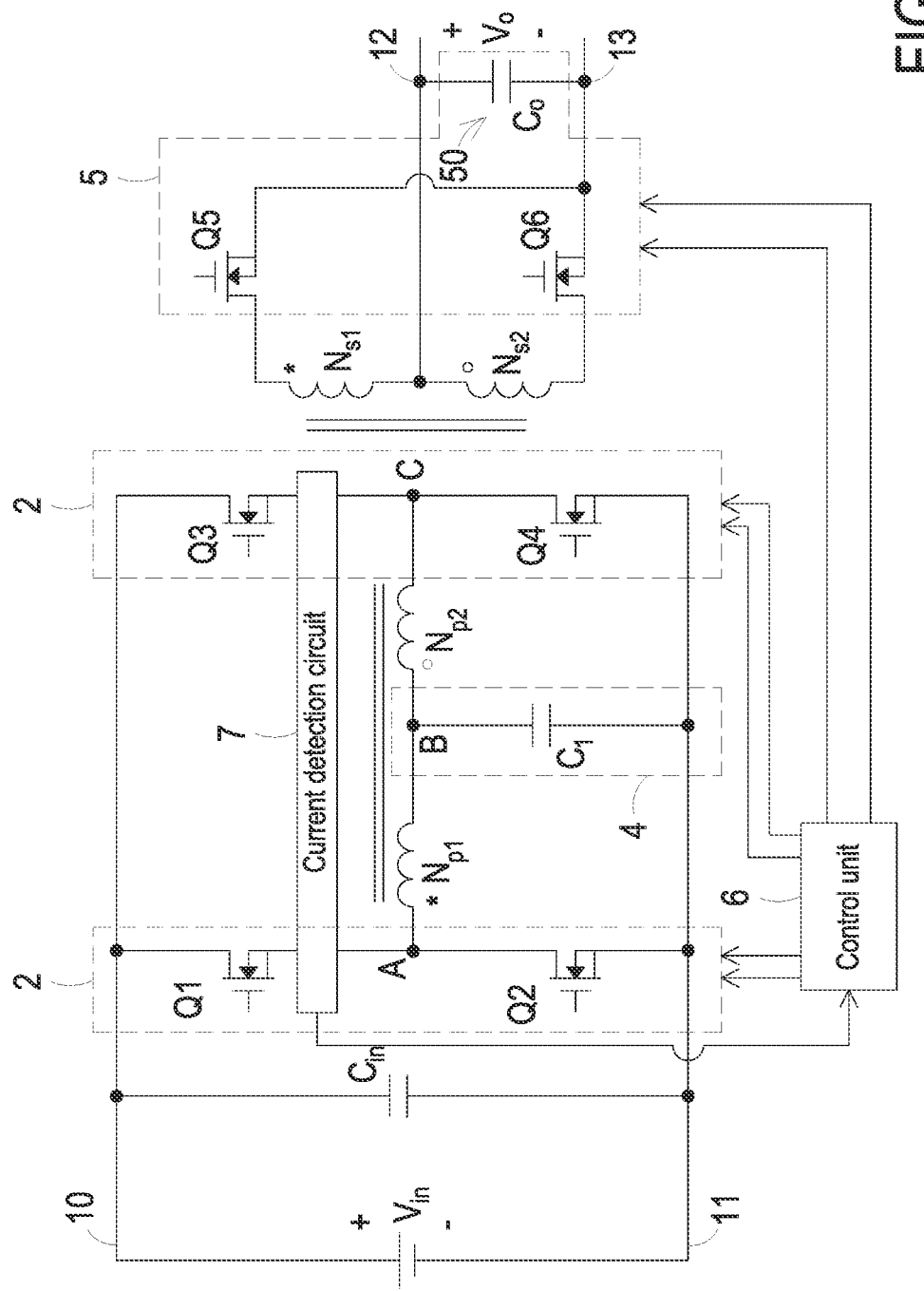
FIG. 6 is a schematic circuit diagram illustrating a power conversion module according to a fourth embodiment of the present disclosure.

FIG. 6 is a schematic circuit diagram illustrating a power conversion module according to a fourth embodiment of the present disclosure. In comparison with the power conversion module 1a of FIG. 1A, the power conversion module 6a of this embodiment includes a control unit 6. The control unit 6 issues six driving signals to control the operations of the first power switch Q1, the second power switch Q2, the third power switch Q3, the fourth power switch Q4, the first rectifying element Q5 and the second rectifying element Q6. In case that the energy storage capacitor set 4 is electrically connected with the input negative terminal 11 (e.g., the example of FIG. 1A), the driving signals for controlling the first rectifying element Q5 and the second power switch Q2 in the steady state are identical, and the driving signals for controlling the second rectifying element Q6 and the fourth power switch Q4 in the steady state are identical. In case that the energy storage capacitor set 4 is electrically connected with the input positive terminal 10 (e.g., the example of FIG. 1B), the driving signals for controlling the first rectifying element Q5 and the first power switch Q1 in the steady state are identical, and the driving signals for controlling the second rectifying element Q6 and the third power switch Q3 in the steady state are identical.

As mentioned above, the rectifier circuit 5, the second winding $N_{s1}$ and the fourth winding $N_{s2}$ are collaboratively formed as a full-wave rectifier circuitry structure. Consequently, there may be a risk of uneven current flow between the second winding $N_{s1}$ and the fourth winding $N_{s2}$. The DC current error of the second winding $N_{s1}$ and the fourth winding $N_{s2}$ may result in a non-zero DC magnetic voltage on the magnetic loop of the first lateral leg 32 and the second lateral leg 33 of the magnetic core 30. The non-zero DC magnetic voltage will cause the DC magnetic flux density on the first lateral leg 32 and the second lateral leg 33 to increase or decrease greatly, thereby bringing about the risk of the magnetic density saturation of the first lateral leg 32 and the second lateral leg 33.

For solving the drawbacks from the full-wave rectifier circuitry structure, the power conversion module 6a of this embodiment further includes a current detection circuit 7. The current detection circuit 7 is electrically connected with the main power switches. For example, the current detection circuit 7 is electrically connected with the first power switch Q1 and the third power switch Q3. Moreover, the current flowing through the first power switch Q1 and the current flowing through the third power switch Q3 are sampled by the current detection circuit 7. The sampling result is transmitted from the current detection circuit 7 to the control unit 6. After the sampling result from the current detection circuit 7 is filtered by the control unit 6, the DC component of the current flowing through the first power switch Q1 and the DC component of the current flowing through the third power switch Q3 are acquired. Then, the difference of the two DC components is subjected to an integration. According to the integration result, the driving signals for controlling the first power switch Q1 and the third power switch Q3 are adjusted. By adjusting the duty cycles of the two driving signals, the equivalent DC current of the first winding $N_{p1}$ and the equivalent DC current of the third winding $N_{p2}$ are in a current-sharing state. Consequently, the DC current error of the second winding $N_{s1}$ and the fourth winding $N_{s2}$ will be reduced, and the risk of the magnetic density saturation of the first lateral leg 32 and the second lateral leg 33 will be minimized.

Figure 7:
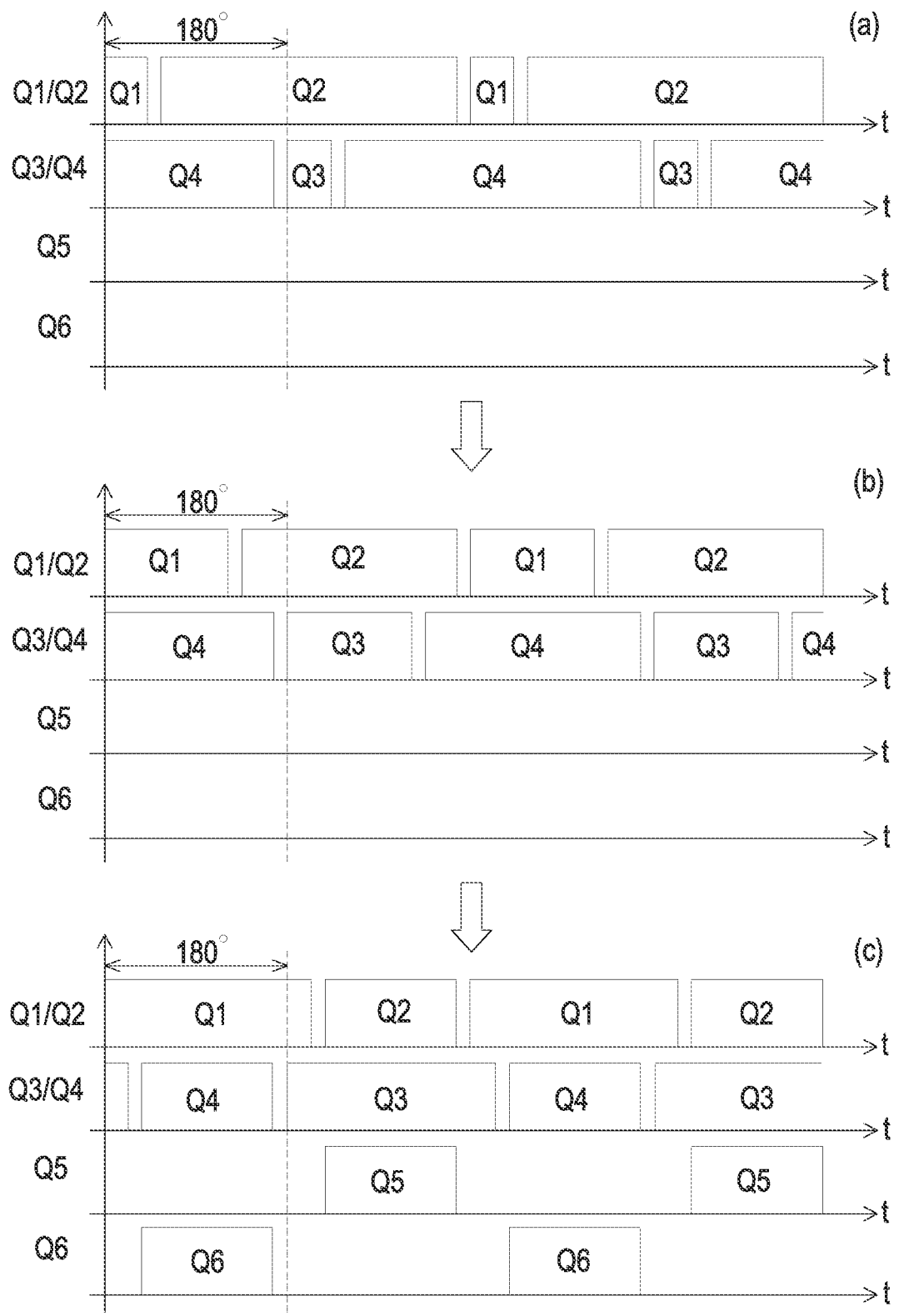
FIG. 7 schematically illustrates the actions of the first power switch, the second power switch, the third power switch, the fourth power switch, the first rectifying element and the second rectifying element of the power conversion module as shown in FIG. 1A or FIG. 6 during a pre-bias start process.

FIG. 7 schematically illustrates the actions of the first power switch, the second power switch, the third power switch, the fourth power switch, the first rectifying element and the second rectifying element of the power conversion module as shown in FIG. 1A or FIG. 6 during a pre-bias start process. Before the power conversion module 1a of FIG. 1A or the power conversion module 6a of FIG. 6 is subjected to the pre-bias start process (i.e., before the conversion power module 1a or 6a is started), the output capacitor $C_o$ has the pre-bias voltage. If the duty cycles of the first rectifying element Q5 and the second power switch Q2 are equal and the duty cycles of the second rectifying element Q6 and the fourth power switch Q4 are equal, the output capacitor $C_o$ of the output capacitor set 50 may instantly charge the energy storage capacitor $C_1$ of the energy storage capacitor set 4. Consequently, a huge inrush current is generated in the power conversion module 1a or 6a. For avoiding the influence of the inrush current on the energy storage capacitor $C_1$. The pre-bias start process of the present disclosure is modified.

Please refer to the situation (a) of FIG. 7. In the initial start stage of the power conversion module 1a or 6a (e.g., the capacitor voltage $V_{c1}$ of the energy storage capacitor $C_1$ is lower than a threshold voltage value $V_{th}$), the on/off states of the two power switches in the same bridge arm of the primary side are complementary to each other. That is, the on/off states of the first power switch Q1 and the on/off states of the second power switch Q2 are complementary to each other, and the on/off states of the third power switch Q3 and the on/off states of the fourth power switch Q4 are complementary to each other. The first power switch Q1 and the third power switch Q3 are the main power switches. The phase difference between the driving signals for controlling the first power switch Q1 and the third power switch Q3 is 180 degrees. In addition, the duty cycles of the first power switch Q1 and the third power switch Q3 are smaller. In this stage, the first rectifying element Q5 and the second rectifying element Q6 are temporarily turned off. Since the on/off states of the two power switches in the same bridge arm are complementary to each other, the power conversion module 1a, 6a is equivalent to a buck circuit in a synchronous rectifying mode. Consequently, the capacitor voltage $V_{c1}$ of the energy storage capacitor $C_1$ can be expressed by the following mathematic formula:

$$V_{c1} = DV_{in} \quad (4)$$

Please refer to the situation (b) of FIG. 7. The duty cycles of the first power switch Q1 and the third power switch Q3 are increased. Consequently, the capacitor voltage $V_{c1}$ of the energy storage capacitor $C_1$ is gradually increased.

Please refer to the situation (c) of FIG. 7. When the capacitor voltage $V_{c1}$ of the energy storage capacitor $C_1$ is lower than a threshold voltage value $V_{th}$, the first rectifying element Q5 and the second rectifying element Q6 are operated in the synchronous rectifying mode. That is, the on/off states of the first rectifying element Q5 and the second power switch Q2 are identical, and on/off states of the second rectifying element Q6 and the fourth power switch Q4 are identical. The threshold voltage value $V_{th}$ is determined according to N times the output voltage $V_o$ and a voltage error $V_A$. For example, $V_{th}=N \times V_o+V_A$. Consequently, the influence of the inrush current of the output capacitor $C_o$ on the energy storage capacitor $C_1$ will be effectively avoided. Moreover, since the primary side of the power conversion module 1a or 6a is continuously in the synchronous rectifying mode, the voltage of the output capacitor $C_o$ can be calculated directly. Consequently, it is not necessary to additionally detect the terminal voltages of the first rectifying element Q5 and the second rectifying element Q6. After the output voltage $V_o$ is sampled and inputted into the control unit 6, the output voltage $V_o$ is compared with the product of the input voltage $V_{in}$ and the duty cycle D of the main power switch, the start control of the first rectifying element Q5 and the second rectifying element Q6 can be achieved. Consequently, the sampling circuit is simplified.

In the embodiment of FIG. 1B, the energy storage capacitor set 4 is electrically connected with the input positive terminal 10. Consequently, the influence of the inrush current of the output capacitor $C_o$ on the energy storage capacitor $C_2$ will be effectively avoided. In the initial start stage of the power conversion module 1b (e.g., the capacitor voltage $V_{c2}$ of the energy storage capacitor $C_2$ is lower than the threshold voltage value $V_{th}$), the on/off states of the two power switches in the same bridge arm of the primary side are complementary to each other. That is, the on/off states of the first power switch Q1 and the on/off states of the second power switch Q2 are complementary to each other, and the on/off states of the third power switch Q3 and the on/off states of the fourth power switch Q4 are complementary to each other. The second power switch Q2 and the fourth power switch Q4 are the main power switches. The phase difference between the driving signals for controlling the second power switch Q2 and the fourth power switch Q4 is 180 degrees. In addition, the duty cycles of the second power switch Q2 and the fourth power switch Q4 are smaller. In this stage, the first rectifying element Q5 and the second rectifying element Q6 are temporarily turned off.

When the capacitor voltage $V_{c2}$ of the energy storage capacitor $C_2$ is lower than a threshold voltage value $V_{th}$, the first rectifying element Q5 and the second rectifying element Q6 are operated in the synchronous rectifying mode. That is, the on/off states of the first rectifying element Q5 and the first power switch Q1 are identical, and the on/off states of the second rectifying element Q6 and the third power switch Q3 are identical. The duty cycles of the second power switch Q2 and the fourth power switch Q4 are increased. Consequently, the capacitor voltage $V_{c2}$ of the energy storage capacitor $C_2$ is gradually increased. Consequently, the influence of the inrush current of the output capacitor $C_o$ on the energy storage capacitor $C_2$ will be effectively avoided.

Figure 8A:
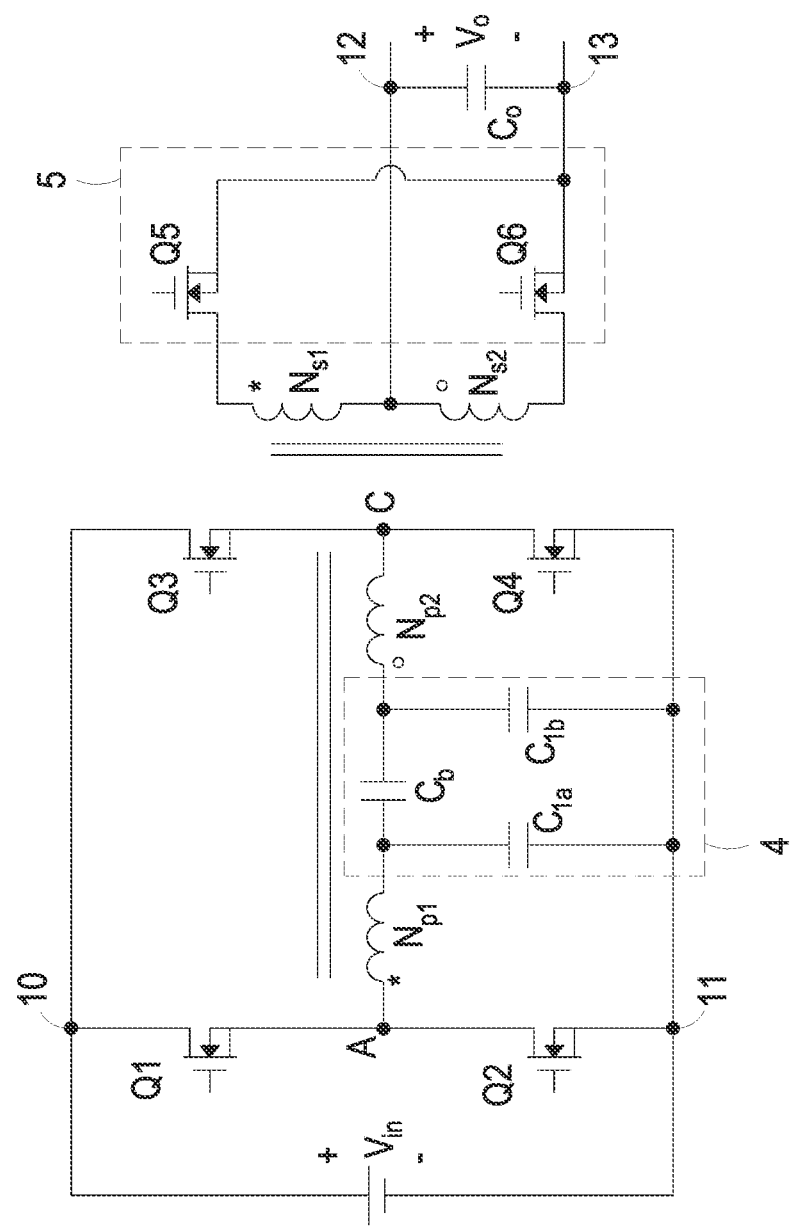
FIG. 8A is a schematic circuit diagram illustrating a power conversion module according to a fifth embodiment of the present disclosure.

FIG. 8A is a schematic circuit diagram illustrating a power conversion module according to a fifth embodiment of the present disclosure. In comparison with the power conversion module 1a of FIG. 1A, the energy storage capacitor set 4 of the power conversion module 8a of this embodiment includes a first energy storage capacitor $C_{1a}$ and a second energy storage capacitor $C_{1b}$. The first terminal of the first energy storage capacitor $C_{1a}$ is electrically connected with the second terminal of the first winding $N_{p1}$. The second terminal of the first energy storage capacitor $C_{1a}$ is electrically connected with the input negative terminal 11. The first terminal of the second energy storage capacitor $C_{1b}$ is electrically connected with the first terminal of the third winding $N_{p2}$. The second terminal of the second energy storage capacitor $C_{1b}$ is electrically connected with the input negative terminal 11. The operations and functions of the power conversion module 8a are similar to those of the power conversion module 1a as shown in FIG. 1a, and not redundantly described herein.

Figure 8B:
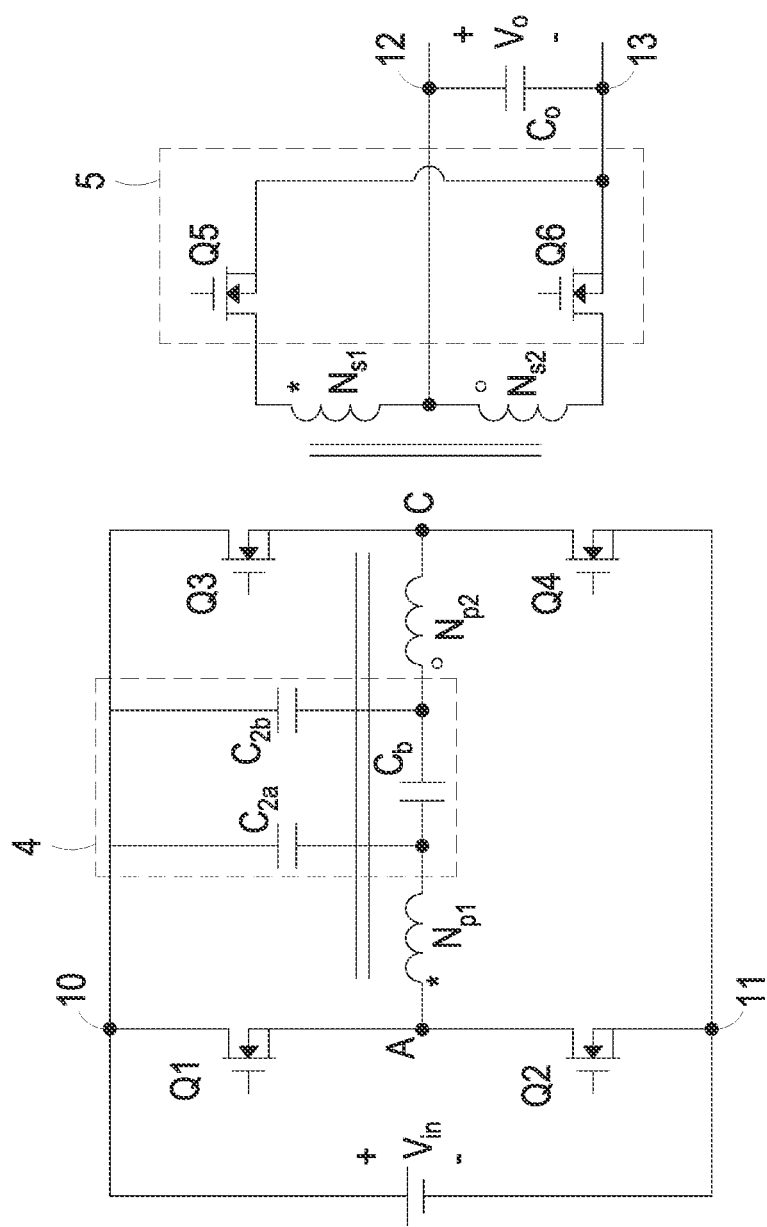
FIG. 8B is a schematic circuit diagram illustrating a power conversion module according to a sixth embodiment of the present disclosure.

FIG. 8B is a schematic circuit diagram illustrating a power conversion module according to a sixth embodiment of the present disclosure. In comparison with the power conversion module $1_b$ of FIG. 1B, the energy storage capacitor set 4 of the power conversion module 8b of this embodiment includes a third energy storage capacitor $C_{2a}$ and a fourth energy storage capacitor $C_{2b}$. The first terminal of the third energy storage capacitor $C_2a$ is electrically connected with the second terminal of the first winding $N_{p1}$. The second terminal of the third energy storage capacitor $C_{2a}$ is electrically connected with the input positive terminal 10. The first terminal of the fourth energy storage capacitor $C_{2b}$ is electrically connected with the first terminal of the third winding $N_{p2}$. The second terminal of the fourth energy storage capacitor $C_{2b}$ is electrically connected with the input positive terminal 10.

Figure 8C:
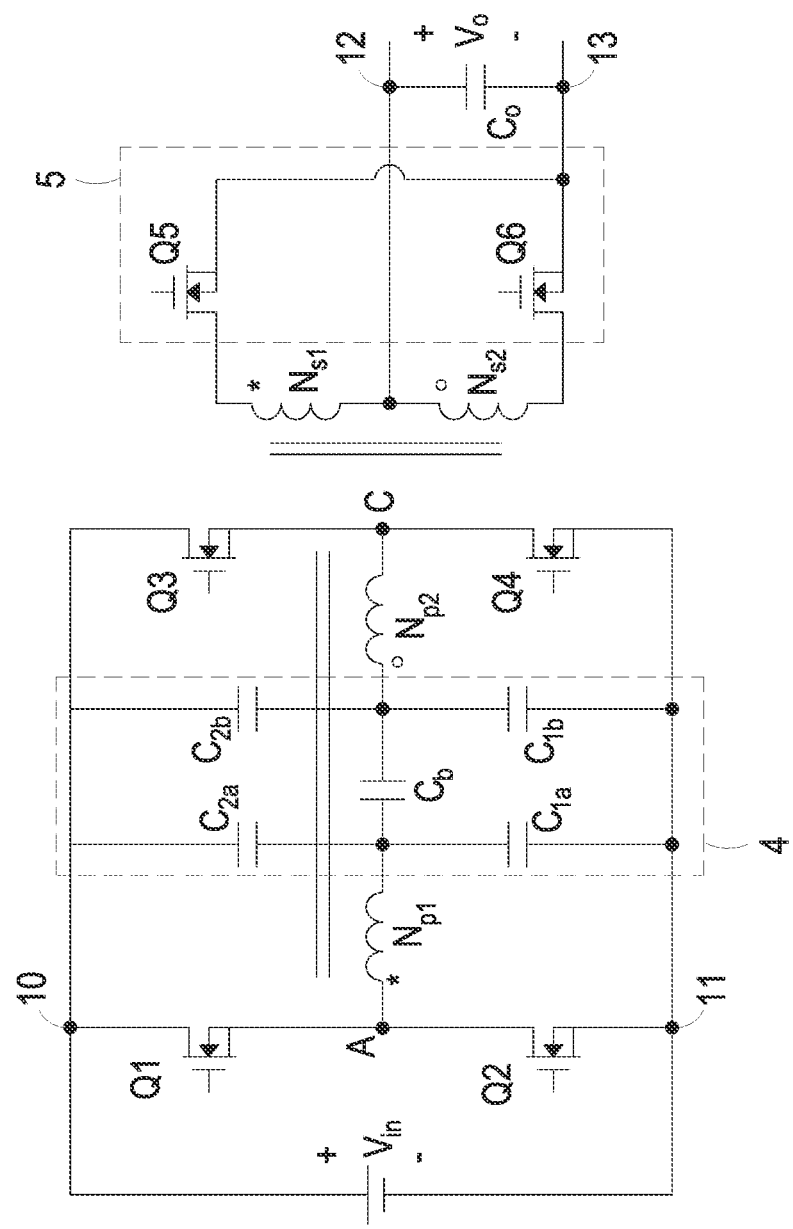
FIG. 8C is a schematic circuit diagram illustrating a power conversion module according to a seventh embodiment of the present disclosure.

FIG. 8C is a schematic circuit diagram illustrating a power conversion module according to a seventh embodiment of the present disclosure. In comparison with the power conversion module 1c of FIG. 1C, the energy storage capacitor set 4 of the power conversion module 8c of this embodiment includes a first energy storage capacitor $C_{1a}$, a second energy storage capacitor $C_{1b}$, a third energy storage capacitor $C_{2a}$ and a fourth energy storage capacitor $C_{2b}$. The first terminal of the first energy storage capacitor $C_{1a}$ is electrically connected with the second terminal of the first winding $N_{p1}$. The second terminal of the first energy storage capacitor $C_{1a}$ is electrically connected with the input negative terminal 11. The first terminal of the second energy storage capacitor $C_{1b}$ is electrically connected with the first terminal of the third winding $N_{p2}$. The second terminal of the second energy storage capacitor $C_{1b}$ is electrically connected with the input negative terminal 11. The first terminal of the third energy storage capacitor $C_{2a}$ is electrically connected with the second terminal of the first winding $N_{p1}$. The second terminal of the third energy storage capacitor $C_{2a}$ is electrically connected with the input positive terminal 10. The first terminal of the fourth energy storage capacitor $C_{2b}$ is electrically connected with the first terminal of the third winding $N_{p2}$. The second terminal of the fourth energy storage capacitor $C_{2b}$ is electrically connected with the input positive terminal 10.

In an embodiment, the energy storage capacitor set 4 further includes a blocking capacitor $C_b$. The first terminal of the blocking capacitor $C_b$ is electrically connected with the second terminal of the first winding $N_{p1}$ and the first terminal of the first energy storage capacitor $C_{1a}$. The second terminal of the blocking capacitor $C_b$ is electrically connected with the first terminal of the third winding $N_{p2}$ and the first terminal of the second energy storage capacitor $C_{1b}$. The blocking capacitor $C_b$ provides a current-sharing function of adjusting the DC current error between the first winding $N_{p1}$ and the third winding $N_{p2}$ to be zero. Consequently, the extra DC magnetic fluxes are not generated on the two lateral legs of the magnetic core, and the magnetic saturation problems of the two lateral legs are avoided.

Figure 9:
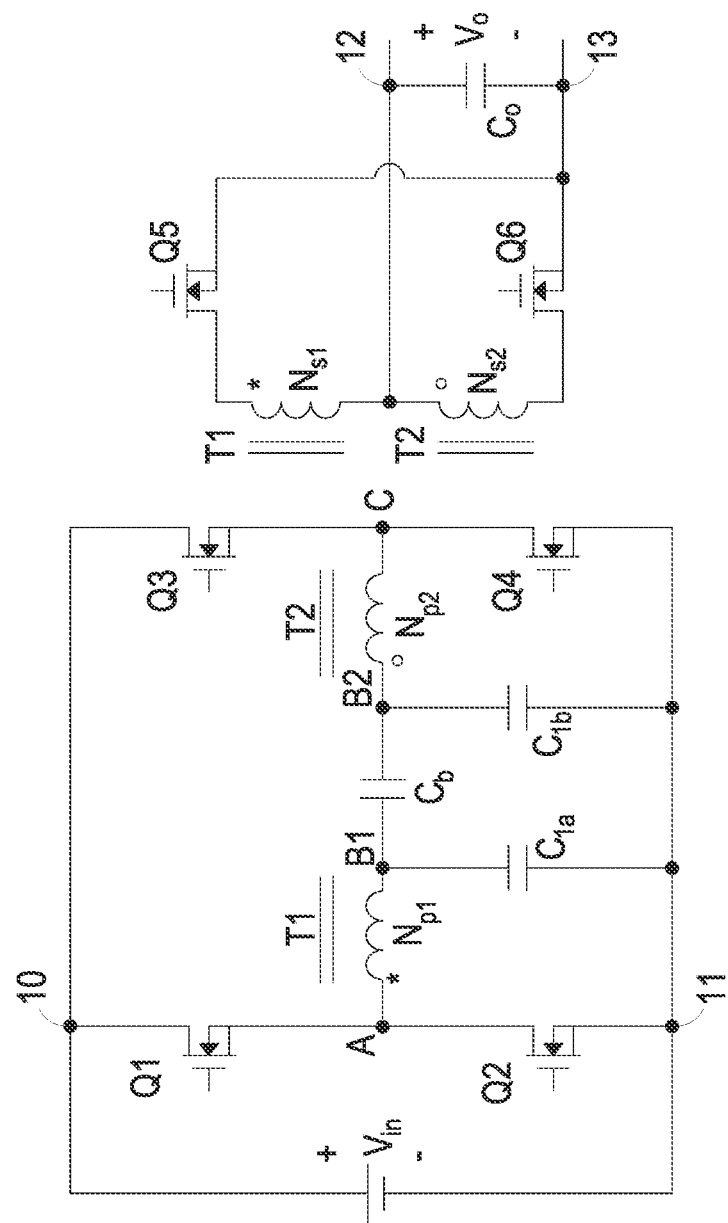
FIG. 9 is a schematic circuit diagram illustrating a power conversion module according to an eighth embodiment of the present disclosure.

FIG. 9 is a schematic circuit diagram illustrating a power conversion module according to an eighth embodiment of the present disclosure. In comparison with the power conversion module 8a of FIG. 8A, the magnetic device 3 of the power conversion module 9a of this embodiment includes two magnetic cores T1 and T2. In this embodiment, the magnetic integration technology is not adopted. Instead, the first coupled winding pair 36 and the second coupled winding pair 37 are wound on the corresponding magnetic cores respectively. For example, the first winding $N_{p1}$ and the second winding $N_{s1}$ of the first coupled winding pair 36 are wound on the magnetic core T1, and the third winding $N_{p2}$ and the fourth winding $N_{s2}$ of the second coupled winding pair 37 are wound on the magnetic core T2.

Figure 10:
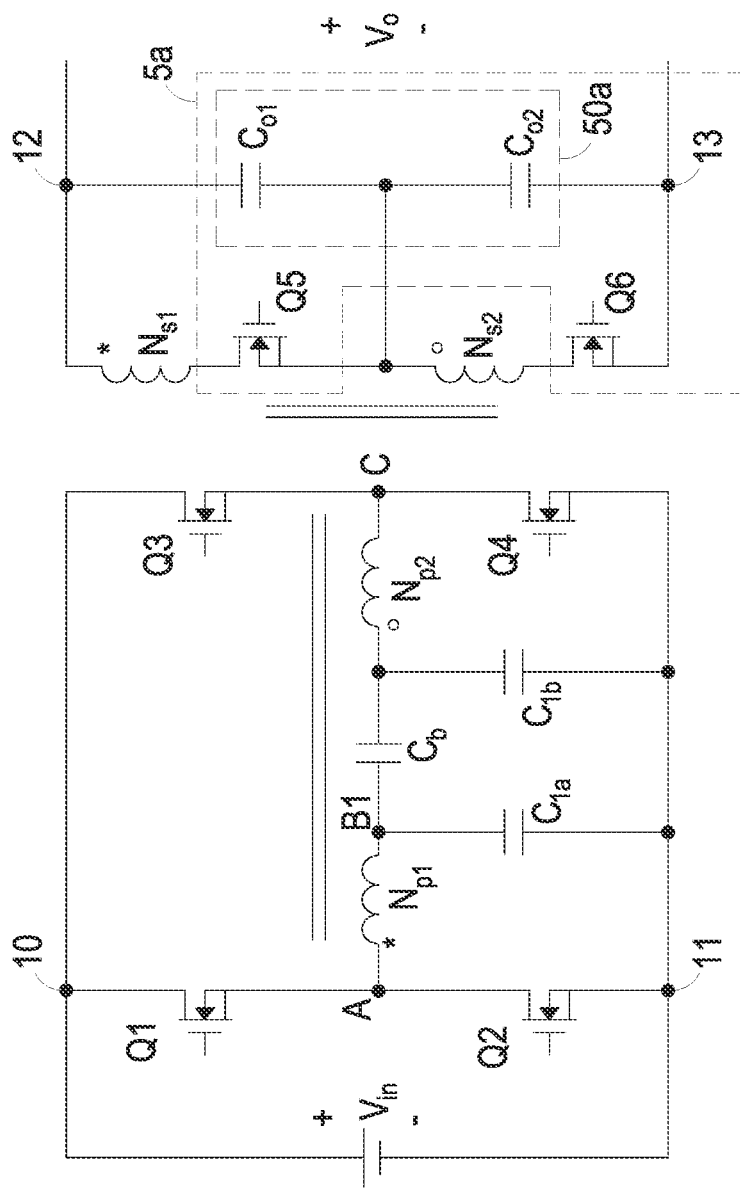
FIG. 10 is a schematic circuit diagram illustrating a power conversion module according to a ninth embodiment of the present disclosure.

FIG. 10 is a schematic circuit diagram illustrating a power conversion module according to a ninth embodiment of the present disclosure. In comparison with the power conversion module 8a of FIG. 8A, the power conversion module 10a of this embodiment is suitably applied to the situation requiring high output voltage Vo. For example, the output voltage $V_o$ is higher than $V_{in}/N$. In the power conversion circuit 10a of this embodiment, the rectifier circuit 5a, the second winding $N_{s1}$ and the fourth winding $N_{s2}$ are collaboratively formed as a doubler rectifier circuitry structure. The rectifier circuit 5a includes an output capacitor set 50a, a first rectifying element Q5 and a second rectifying element Q6. For example, the first rectifying element Q5 and the second rectifying element Q6 are power switches. A first current loop is defined by the first rectifying element Q5, the second winding $N_{s1}$ and at least a part of the output capacitor set 50a collaboratively. A second current loop is defined by the second rectifying element Q6, the fourth winding $N_{s2}$ and at least a part of the output capacitor set 50a collaboratively. The first terminal of the first rectifying element Q5 is electrically connected with the second terminal of the second winding $N_{s1}$. The second terminal of the first rectifying element Q5 is electrically connected with the first terminal of the fourth winding $N_{s2}$. The first terminal of the second rectifying element Q6 is electrically connected with the second terminal of the fourth winding $N_{s2}$. The second terminal of the second rectifying element Q6 is electrically connected with the output negative terminal 13. The output capacitor set 50a includes a first output capacitor $C_{o1}$ and a second output capacitor $C_{o2}$. The first terminal of the first output capacitor $C_{o1}$ is electrically connected with the output positive terminal 12 and the first terminal of the second winding $N_{s1}$. The second terminal of the first output capacitor $C_{o1}$ is electrically connected with the second terminal of the first rectifying element Q5. The second terminal of the first rectifying element Q5 and the first terminal of the fourth winding $N_{s2}$ are connected with an output midpoint. In other words, the serially-connected structure of the second winding $N_{s1}$ and the first rectifying element Q5 are connected with the first output capacitor $C_{o1}$ in parallel, and electrically connected between the output positive terminal 12 and the output midpoint. A first current loop is defined by the first rectifying element Q5, the second winding $N_{s1}$ and the first output capacitor $C_{o1}$ collaboratively. The first terminal of the second output capacitor $C_{o2}$ is electrically connected with the first terminal of the fourth winding $N_{s2}$ and the second terminal of the first output capacitor $C_{o1}$. The second terminal of the second output capacitor $C_{o2}$ is electrically connected with the output negative terminal 13. In other words, the serially-connected structure of the fourth winding $N_{s2}$ and the second rectifying element Q6 are connected with the second output capacitor $C_{o2}$ in parallel, and electrically connected between the output midpoint and the output negative terminal 13. Moreover, a second current loop is defined by the second rectifying element Q6, the fourth winding $N_{s2}$ and the second output capacitor $C_{o2}$ collaboratively.

The operations of the first power switch Q1, the second power switch Q2, the third power switch Q3, the fourth power switch Q4, the first rectifying element Q5 and the second rectifying element Q6 of the power conversion module 10a are similar to those of the power conversion module 1a as shown in FIG. 1A, and not redundantly described herein. In comparison with the embodiment of FIG. 1A, the secondary side of the power conversion module 10a of this embodiment has the doubler rectifying circuitry structure. Consequently, the voltage stresses of the first rectifying element Q5 and the second rectifying element Q6 can be effectively reduced. The power switches capable of withstanding lower voltages and with lower on resistance are suitably used as the first rectifying element Q5 and the second rectifying element Q6. Moreover, the conversion efficiency of the power conversion module 10a is enhanced.

Figure 11:
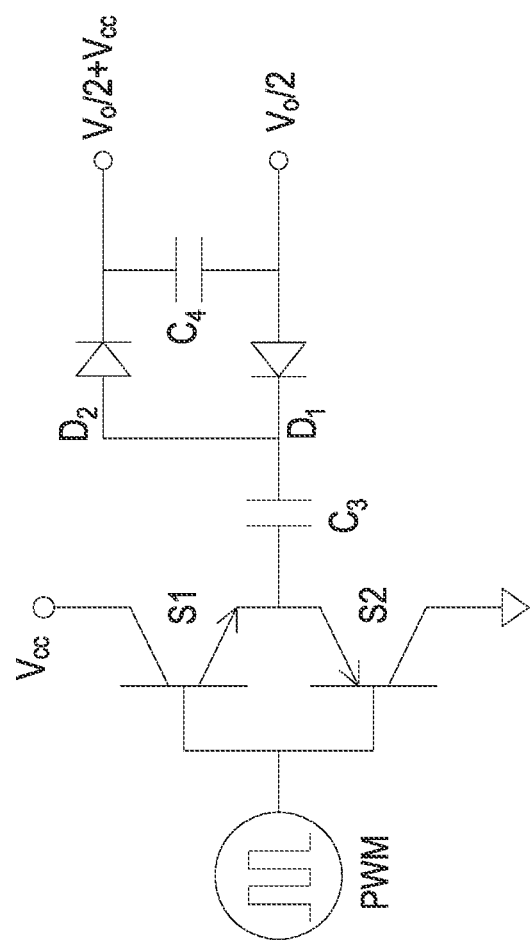
FIG. 11 is a schematic circuit diagram illustrating a power supply circuit for powering a floating drive circuit of the first rectifying element of the power conversion module as shown in FIG. 10.

FIG. 11 is a schematic circuit diagram illustrating a power supply circuit for powering a floating drive circuit of the first rectifying element of the power conversion module as shown in FIG. 10. Since the first rectifying element Q5 of the power conversion module as shown in FIG. 10 is not connected to the ground terminal, the first rectifying element Q5 needs to be driven by a floating drive circuit (not shown). In FIG. 11, a power supply circuit 8 for powering the floating drive circuit is shown. The power supply circuit 8 includes a first supply switch S1, a second supply switch S2, a first drive capacitor $C_3$, a second drive capacitor $C_4$, a first diode $D_1$ and a second diode D2. The first supply switch S1 is an NPN bipolar transistor. The base of the first supply switch S1 receives a pulse width modulation signal PWM. The collector of the first supply switch S1 receives the voltage source $V_{cc}$. The second supply switch S2 is a PNP bipolar transistor. The base of the second supply switch S2 receives a pulse width modulation signal PWM. The emitter of the second supply switch S2 is connected with the emitter of the first supply switch S1. The collector of the second supply switch S2 is electrically connected with the output negative terminal 13 as shown in FIG. 10. The first terminal of the first drive capacitor $C_3$ is electrically connected with the emitter of the second supply switch S2 and the emitter of the first supply switch S1. The cathode of the first diode $D_1$ is electrically connected with the second terminal of the first drive capacitor $C_3$. The anode of the second diode $D_2$ is electrically connected with the second terminal of the first drive capacitor $C_3$. The second drive capacitor $C_4$ is electrically connected between the anode of the first diode $D_1$ and the cathode of the second diode $D_2$.

When the pulse width modulation signal PWM is in the low voltage level state, the first supply switch S1 is turned off, and the second supply switch S2 is turned on. The first drive capacitor $C_3$ is charged by the output capacitor $C_{o2}$ as shown in FIG. 10. The voltage of the first drive capacitor $C_3$ is equal to a half of the output voltage $V_o$ (i.e., $V_o/2$). When the pulse width modulation signal PWM is in the high voltage level state, the first supply switch S1 is turned on, and the second supply switch S2 is turned off. The voltage of the joint point of the first drive capacitor $C_3$ and the second diode D2 is equal to a half of the output voltage $V_o$ plus the voltage source $V_{cc}$ (i.e., $V_o/2+V_{ee}$). The first diode D1 is turned off. The second diode D2 is turned on. The second drive capacitor $C_4$ is charged by the first drive capacitor $C_3$. The voltage across the second drive capacitor $C_4$ is equal to voltage source $V_{cc}$. In addition, the floating drive circuit of the first rectifying element Q5 is driven.

Figure 12:
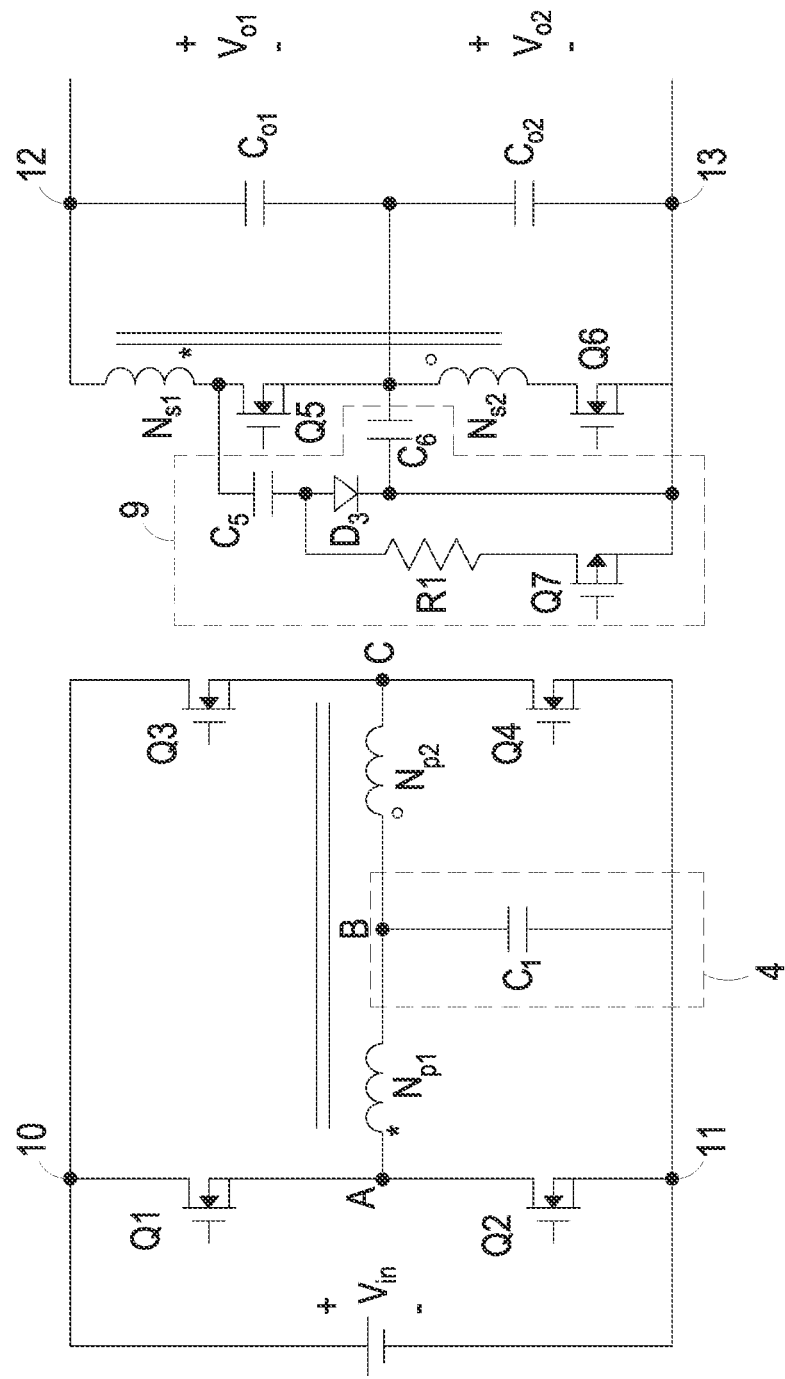
FIG. 12 is a schematic circuit diagram illustrating a power conversion module according to a tenth embodiment of the present disclosure.

FIG. 12 is a schematic circuit diagram illustrating a power conversion module according to a tenth embodiment of the present disclosure. In comparison with the power conversion 10a of FIG. 10A, the energy storage capacitor set 4 of the power conversion module 12a of this embodiment is similar to that of FIG. 1A, but the power conversion module 12a of this embodiment further includes an active snubber circuit 9. The active snubber circuit 9 includes a fifth power switch Q7, a resistor $R_1$, a first snubber capacitor $C_5$, a second snubber capacitor $C_6$ and a third diode $D_3$. For example, the fifth power switch Q7 is a P-type metal-oxide semiconductor (PMOS) transistor. The first terminal of the fifth power switch Q7 is electrically connected with the second terminal of the resistor $R_1$. The second terminal of the fifth power switch Q7 is electrically connected with the output negative terminal 13. The anode terminal of the third diode $D_3$ is electrically connected with the first terminal of the resistor $R_1$. The cathode terminal of the third diode $D_3$ is electrically connected with the output negative terminal 13. The first terminal of the first snubber capacitor $C_5$ is electrically connected with the second terminal of the second winding $N_{s1}$ and the first terminal of the first rectifying element Q5. The second terminal of the first snubber capacitor $C_5$ is electrically connected with the first terminal of the resistor $R_1$ and the anode terminal of the third diode $D_3$. The first terminal of the second snubber capacitor $C_6$ is electrically connected with the cathode terminal of the third diode $D_3$ and the output negative terminal 13. The second terminal of the second snubber capacitor $C_6$ is electrically connected with the second terminal of the first rectifying element Q5 and the first terminal of the fourth winding $N_{s2}$.

When the reverse recovery of the first rectifying element Q5 is ended, the reverse recovery current is absorbed by the first snubber capacitor $C_5$, the third diode $D_3$, and the second snubber capacitor $C_6$. After the reverse recovery of the first rectifying element Q5 is ended and while first rectifying element Q5 is turned off, the fifth power switch Q7 is turned on. Consequently, the energy of the reverse recovery current stored in the first snubber capacitor $C_5$ can be released to the output voltage $V_o$ through the fifth power switch Q7, the resistor $R_1$ and the second winding $N_{s1}$.

In other words, the active snubber circuit 9 of the power conversion module 12a can reduce the voltage stress that is caused by the reverse recovery of the first rectifying element Q5. Consequently, the energy balance of the first snubber capacitor $C_5$ can be maintained. Moreover, since the fifth power switch Q7 is a PMOS and the gate terminal is connected to the ground, the circuitry of the driving circuit (not shown) for driving the fifth power switch Q7 is simple.

It is noted that numerous modifications and alterations may be made while retaining the teachings of the invention. For example, in another embodiment, the active snubber circuit 9 omits the resistor $R_1$. In other words, the first terminal of the fifth power switch Q7 is electrically connected with the second terminal of the first snubber capacitor $C_5$ and the anode terminal of the third diode $D_3$.

From the above descriptions, the present disclosure provides a power conversion module. The power conversion module includes a full-bridge switching circuit, a first coupled winding pair, a second coupled winding pair and an energy storage capacitor set. The energy storage capacitor set is electrically connected with the node B (i.e., the node between the first winding and the third winding) and the input negative terminal. Due to this circuitry design and the associated control method, the maximum duty cycle of the power conversion module can be previously determined. For example, by adjusting the turn ratio between the first winding and the second winding or the turn ratio between the third winding and the fourth winding, the on/off states of the two power switches in the same bridge arm are complementary to each other, and the phase between two power switches in the different bridge arms is 180 degrees, and the rectifying elements of the secondary side are synchronous with the main power switches. Consequently, the maximum duty cycle of the power conversion module can be previously determined. For example, the duty cycle can be expanded to the value greater than 0.5 or even close to 1. Consequently, the power conversion module has many benefits. For example, the voltage gain variation range of the power conversion module is broadened. Moreover, the turn ratio between the first winding and the second winding or the turn ratio between the third winding and the fourth winding is large. The current effective value of the first winding or the third winding is low. The rectifying elements capable of withstanding lower voltages are suitably used as the first rectifying element and the second rectifying element. Moreover, the conversion efficiency of the power conversion module is higher.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power conversion module, comprising:
   an input port comprising an input positive terminal and an input negative terminal;
   an output port comprising an output positive terminal and an output negative terminal;
   a full-bridge switching circuit comprising a first power switch, a second power switch, a third power switch and a fourth power switch, wherein a first terminal of the first power switch is electrically connected with the input positive terminal, a first terminal of the second power switch and a second terminal of the first power switch are electrically connected with a first midpoint, a second terminal of the second power switch is electrically connected with the input negative terminal, a first terminal of the third power switch is electrically connected with the input positive terminal, a first terminal of the fourth power switch and a second terminal of the third power switch are electrically connected with a second midpoint, and a second terminal of the fourth power switch is electrically connected with the input negative terminal;
   a magnetic device comprising a first coupled winding pair and a second coupled winding pair, wherein the first coupled winding pair comprises a first winding and a second winding, and the second coupled winding pair comprises a third winding and a fourth winding, wherein the first winding and the second winding are coupled to each other, the third winding and the fourth winding are coupled to each other, and the first winding and the third winding are connected in series between the first midpoint and the second midpoint;
   an energy storage capacitor set electrically connected with the input port, and electrically connected with the first winding and the third winding; and
   a rectifier circuit electrically connected with the second winding, the fourth winding and the output port, wherein the rectifier circuit comprises an output capacitor set, a first rectifying element and a second rectifying element, wherein the output capacitor set is electrically connected between the output positive terminal and the output negative terminal, a ratio of an average voltage of the output capacitor set to an average voltage of the energy storage capacitor set is a fixed value, a first current loop is defined by the first rectifying element, the second winding and the output capacitor set collaboratively, and a second current loop is defined by the second rectifying element, the fourth winding and the output capacitor set collaboratively.

2. The power conversion module according to claim 1, wherein a first terminal of the first winding and a first terminal of the second winding are common-polarity terminals, and a first terminal of the third winding and a first terminal of the fourth winding are the common-polarity terminals.

3. The power conversion module according to claim 1, wherein the magnetic device further comprises a magnetic core, and the magnetic core comprises a middle leg, a first lateral leg and a second lateral leg, wherein an air gap of the middle leg is greater than an air gap of the first lateral leg and an air gap of the second lateral leg, wherein the first winding and the second winding are wound on the first lateral leg, and the third winding and the fourth winding are wound on the second lateral leg, wherein DC magnetic fluxes generated by the second winding and the fourth winding are superimposed on the middle leg, and AC magnetic fluxes generated by the second winding and the fourth winding are cancelled out on the middle leg.

4. The power conversion module according to claim 1, wherein on/off states of the first power switch and the second power switch are complementary to each other, and on/off states of the third power switch and the fourth power switch are complementary to each other, wherein a phase difference between a driving signal for controlling the first power switch and a driving signal for controlling the third power switch is 180 degrees, and a phase difference between a driving signal for controlling the second power switch and a driving signal for controlling the fourth power switch is 180 degrees.

5. The power conversion module according to claim 4, wherein a turn ratio of the first winding to the second winding is N, or a turn ratio of the third winding to the fourth winding is N, wherein N is a positive integer smaller than 100, wherein a relationship between an output voltage $V_o$ and an input voltage $V_{in}$ of the power conversion module is expressed as: $V_o = D \times V_{in}/N$, wherein D is a duty cycle of the first power switch or the second power switch, and $0 < D < 1$.

6. The power conversion module according to claim 1, wherein the first rectifying element and the second rectifying element are diodes.

7. The power conversion module according to claim 1, wherein the first rectifying element and the second rectifying element are power switches.

8. The power conversion module according to claim 7, wherein the energy storage capacitor set comprises an energy storage capacitor, wherein a first terminal of the energy storage capacitor is electrically connected with a second terminal of the first winding and a first terminal of the third winding, and a second terminal of the energy storage capacitor is electrically connected with the input negative terminal.

9. The power conversion module according to claim 8, wherein the first power switch and the third power switch are main power switches, wherein driving signals for controlling the first rectifying element and the second power switch in a steady state are identical, and driving signals for controlling the second rectifying element and the fourth power switch in the steady state are identical.

10. The power conversion module according to claim 9, wherein in an initial start stage of the power conversion module, the first rectifying element and the second rectifying element are temporarily turned off, and a duty cycle of the first power switch and a duty cycle of the third power switch are gradually increased, wherein when a voltage of the energy storage capacitor reaches a threshold voltage value, on/off states of the first rectifying element and the second power switch are identical, and on/off states of the second rectifying element and the fourth power switch are identical, wherein the threshold voltage value is determined according to N times an output voltage of the power conversion module and a voltage error.

11. The power conversion module according to claim 9, wherein the power conversion module further comprises a control unit and a current detection circuit, wherein the current detection circuit is electrically connected with the plurality of main power switches to sample a plurality of currents flowing through the plurality of main power switches and transmit a sampling result to the control unit, wherein after the sampling result from the current detection circuit is filtered by the control unit, DC components of the plurality of currents flowing through the plurality of main power switches are acquired, and a difference of the DC components of the plurality of currents flowing through the plurality of main power switches is subjected to an integration, wherein according to an integration result, duty cycles of the plurality of main power switches are adjusted, so that an equivalent DC current of the first winding and an equivalent DC current of the third winding are in a current-sharing state.

12. The power conversion module according to claim 9, wherein when the first power switch, the fourth power switch and the second rectifying element are turned on and the second power switch, the third power switch and the first rectifying element are turned off, a leakage inductor of the second coupled winding pair and a serially-connected structure of the energy storage capacitor set and the output capacitor set coupled to the third winding result in a resonance effect, wherein when the second power switch, the third power switch and the first rectifying element are turned on and the first power switch, the fourth power switch and the second rectifying element are turned off, a leakage inductor of the first coupled winding pair and a serially-connected structure of the energy storage capacitor set and the output capacitor set coupled to the first winding result in the resonance effect.

13. The power conversion module according to claim 12, wherein a current flowing through the first rectifying element and a current flowing through the second rectifying element are sine wave currents or partial sine wave currents.

14. The power conversion module according to claim 12, wherein according to settings of resonant parameters, a current flowing through the second power switch from a Drain to a Source is greater than zero or a current flowing through the fourth power switch from a Drain to a Source is greater than zero, the first rectifying element or the second rectifying element is turned off.

15. The power conversion module according to claim 7, wherein the energy storage capacitor set comprises an energy storage capacitor, wherein a first terminal of the energy storage capacitor is electrically connected with a second terminal of the first winding and a first terminal of the third winding, and a second terminal of the energy storage capacitor is electrically connected with the input positive terminal.

16. The power conversion module according to claim 15, wherein the second power switch and the fourth power switch are main power switches, wherein driving signals for controlling the first rectifying element and the first power switch in a steady state are identical, and driving signals for controlling the second rectifying element and the third power switch in the steady state are identical.

17. The power conversion module according to claim 16, wherein in an initial start stage of the power conversion module, the first rectifying element and the second rectifying element are temporarily turned off, and a duty cycle of the second power switch and a duty cycle of the fourth power switch are gradually increased, wherein when a capacitor voltage of the energy storage capacitor reaches a threshold voltage value, on/off states of the first rectifying element and the first power switch are identical, and on/off states of the second rectifying element and the third power switch are identical, wherein the threshold voltage value is determined according to N times an output voltage of the power conversion module and a voltage error.

18. The power conversion module according to claim 16, wherein the power conversion module further comprises a control unit and a current detection circuit, wherein the current detection circuit is electrically connected with the plurality of main power switches to sample a plurality of currents flowing through the plurality of main power switches and transmit a sampling result to the control unit, wherein after the sampling result from the current detection circuit is filtered by the control unit, DC components of the plurality of currents flowing through the plurality of main power switches are acquired, and a difference of the DC components of the plurality of currents flowing through the plurality of main power switches is subjected to an integration, wherein according to an integration result, duty cycles of the plurality of main power switches are adjusted, so that an equivalent DC current of the first winding and an equivalent DC current of the third winding are in a current-sharing state.

19. The power conversion module according to claim 16, wherein when the first power switch, the fourth power switch and the second rectifying element are turned on and the second power switch, the third power switch and the first rectifying element are turned off, a leakage inductor of the second coupled winding pair and a serially-connected structure of the energy storage capacitor set and the output capacitor set coupled to the third winding result in a resonance effect, wherein when the second power switch, the third power switch and the first rectifying element are turned on and the first power switch, the fourth power switch and the second rectifying element are turned off, a leakage inductor of the first coupled winding pair and a serially-connected structure of the energy storage capacitor set and the output capacitor set coupled to the first winding result in the resonance effect.

20. The power conversion module according to claim 7, wherein the energy storage capacitor set comprises a first capacitor and a second capacitor, wherein a first terminal of the first capacitor is electrically connected with a second terminal of the first winding and a first terminal of the third winding, a second terminal of the first capacitor is electrically connected with the input positive terminal, a first terminal of the second capacitor is electrically connected with the second terminal of the first winding and the first terminal of the third winding, and a second terminal of the second capacitor is electrically connected with the input negative terminal.

21. The power conversion module according to claim 1, wherein a second terminal of the second winding is electrically connected with a first terminal of the fourth winding, and the output capacitor set comprises an output capacitor, wherein a first terminal of the first rectifying element is electrically connected with a first terminal of the second winding, a second terminal of the first rectifying element is electrically connected with a second terminal of the output capacitor and the output negative terminal, a first terminal of the output capacitor is electrically connected with the second terminal of the second winding and the first terminal of the fourth winding, a first terminal of the second rectifying element is electrically connected with a second terminal of the fourth winding, and a second terminal of the second rectifying element is electrically connected with the second terminal of the output capacitor and the output negative terminal.

22. The power conversion module according to claim 1, wherein the energy storage capacitor set comprises a first energy storage capacitor, a second energy storage capacitor and a blocking capacitor, wherein a first terminal of the first energy storage capacitor is electrically connected with a second terminal of the first winding, a second terminal of the first energy storage capacitor is electrically connected with the input negative terminal or the input positive terminal, a first terminal of the second energy storage capacitor is electrically connected with a first terminal of the third winding, a second terminal of the second energy storage capacitor is electrically connected with the input negative terminal or the input positive terminal, a first terminal of the blocking capacitor is electrically connected with the second terminal of the first winding and the first terminal of the first energy storage capacitor, and a second terminal of the blocking capacitor is electrically connected with the first terminal of the third winding and the first terminal of the second energy storage capacitor.

23. The power conversion module according to claim 1, wherein the output capacitor set comprises a first output capacitor and a second output capacitor, wherein a serially-connected structure of the second winding and the first rectifying element is connected with the first output capacitor in parallel, and electrically connected between the output positive terminal and an output midpoint, so that the first current loop is defined by the first rectifying element, the second winding and the first output capacitor collaboratively, wherein a serially-connected structure of the fourth winding and the second rectifying element are connected with the second output capacitor in parallel, and electrically connected between the output midpoint and the output negative terminal, so that the second current loop is defined by the second rectifying element, the fourth winding and the second output capacitor collaboratively.

* * * * *